United States Patent
Seki et al.

(10) Patent No.: US 12,503,112 B2
(45) Date of Patent: Dec. 23, 2025

(54) DRIVING ASSISTANCE DEVICE, DRIVING ASSISTANCE METHOD, AND RECORDING MEDIUM

(71) Applicant: Panasonic Automotive Systems Co., Ltd., Kanagawa (JP)

(72) Inventors: Takaaki Seki, Osaka Fu (JP); Koichi Emura, Kanagawa Ken (JP); Masataka Kato, Kanagawa Ken (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 18/672,928

(22) Filed: May 23, 2024

(65) Prior Publication Data
US 2024/0308516 A1  Sep. 19, 2024

Related U.S. Application Data

(63) Continuation of application No. PCT/JP2022/035540, filed on Sep. 22, 2022.

(30) Foreign Application Priority Data

Nov. 30, 2021 (JP) ................. 2021-195012

(51) Int. Cl.
*B60W 30/18* (2012.01)
*B60Q 9/00* (2006.01)
*B60W 40/08* (2012.01)
*B60W 50/14* (2020.01)
(Continued)

(52) U.S. Cl.
CPC ......... *B60W 30/18009* (2013.01); *B60Q 9/00* (2013.01); *B60W 40/08* (2013.01);
(Continued)

(58) Field of Classification Search
CPC .......... B60W 30/18009; B60W 40/08; B60W 50/14; B60W 2540/0818; B60W 2520/10;
(Continued)

(56) References Cited

U.S. PATENT DOCUMENTS

2019/0340496 A1  11/2019 Kim et al.
2020/0047747 A1*  2/2020 An ................... B60W 10/20
(Continued)

FOREIGN PATENT DOCUMENTS

JP  2006-231962  9/2006
JP  2010-205117  9/2010
(Continued)

OTHER PUBLICATIONS

Translation of WO 2021132566 A1 (Year: 2021).*
(Continued)

*Primary Examiner* — Lixi C Simpson
(74) *Attorney, Agent, or Firm* — Greenblum & Bernstein, P.L.C.

(57) ABSTRACT

A driving assistance device includes a processor connected to a memory. The processor detects a latent recognition region that is unconsciously recognized by a human in an entire imaging region of a captured image. The captured image is captured by an external camera that is provided in a mobile body. The captured image is an image of at least a traveling direction in which the mobile body travels. The latent recognition region is detected based on a predetermined feature value included in the captured image. The processor presents predetermined driving assistance information in a region on a display device. The region is estimated in accordance with the detected latent recognition region.

12 Claims, 34 Drawing Sheets

(51) Int. Cl.
*G06F 3/01* (2006.01)
*G06T 7/70* (2017.01)
*G06V 10/44* (2022.01)
*G06V 10/98* (2022.01)
*G06V 20/56* (2022.01)

(52) U.S. Cl.
CPC ............. *B60W 50/14* (2013.01); *G06F 3/013* (2013.01); *G06T 7/70* (2017.01); *G06V 10/44* (2022.01); *G06V 10/98* (2022.01); *G06V 20/56* (2022.01); *B60W 2040/0818* (2013.01); *B60W 2520/10* (2013.01); *B60W 2540/225* (2020.02); *G06T 2207/30201* (2013.01); *G06T 2207/30268* (2013.01)

(58) Field of Classification Search
CPC ............. G06T 7/70; G06T 2207/30201; G06T 2207/30268; G06V 10/98; G06V 10/44; G06V 20/56; B60Q 9/00; G06F 3/013
See application file for complete search history.

(56) References Cited

U.S. PATENT DOCUMENTS

2020/0404272 A1\* 12/2020 Abe .................... H04N 19/159
2022/0324328 A1    10/2022 Kato et al.

FOREIGN PATENT DOCUMENTS

| JP | 2016-086355 | 5/2016 |
| JP | 2018-173944 | 11/2018 |
| JP | 2019-096109 | 6/2019 |
| WO | 2021/132566 | 7/2021 |

OTHER PUBLICATIONS

International Search Report issued in International Pat. Appl. No. PCT/JP2022/035540, dated Dec. 13, 2022, along with an English translation thereof.

\* cited by examiner

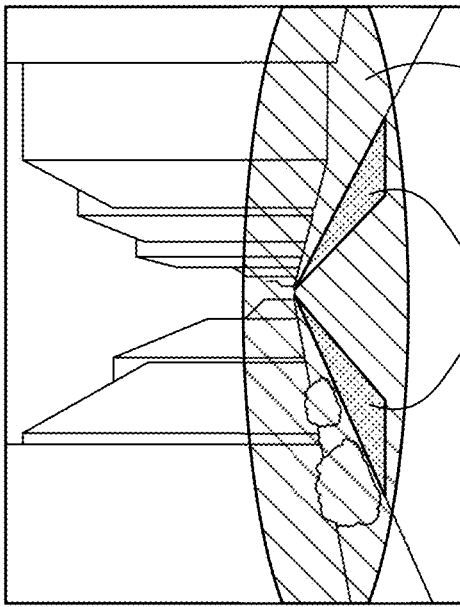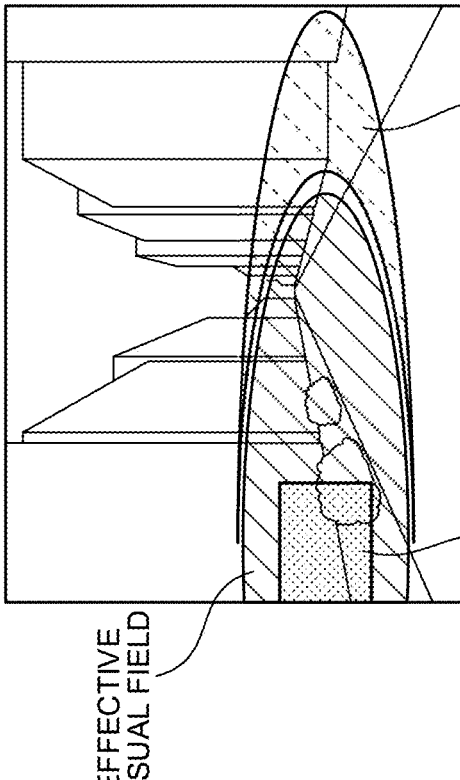

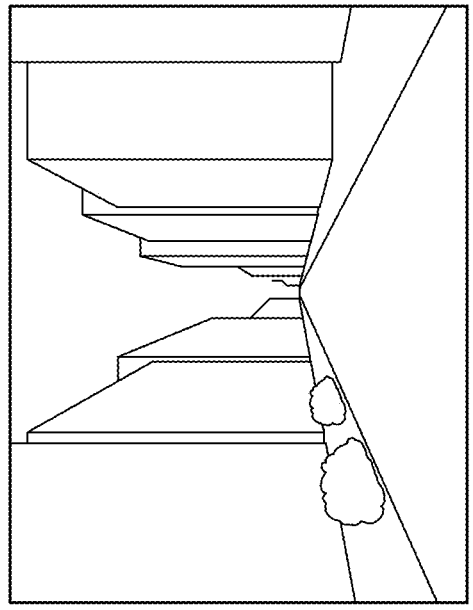
FIG.14B
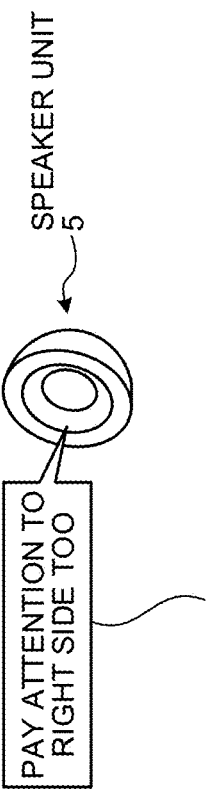
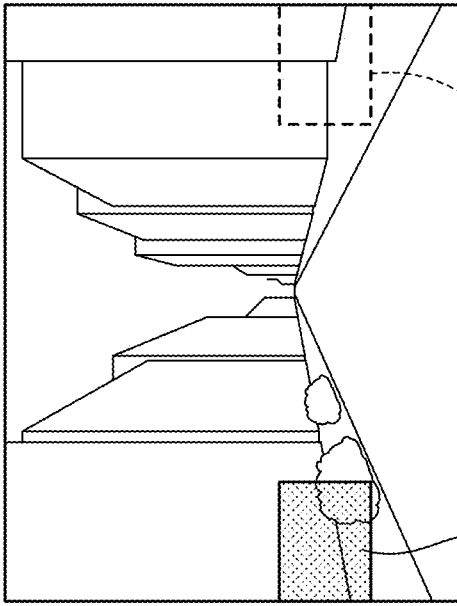
FIG.14A

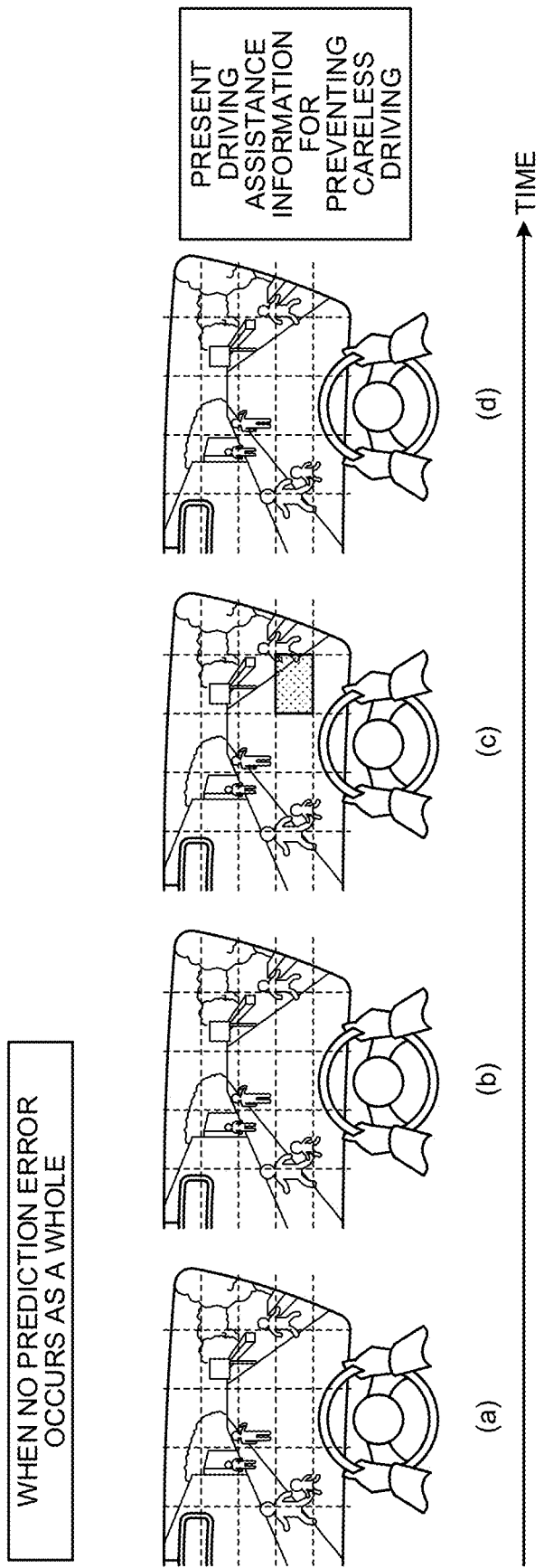

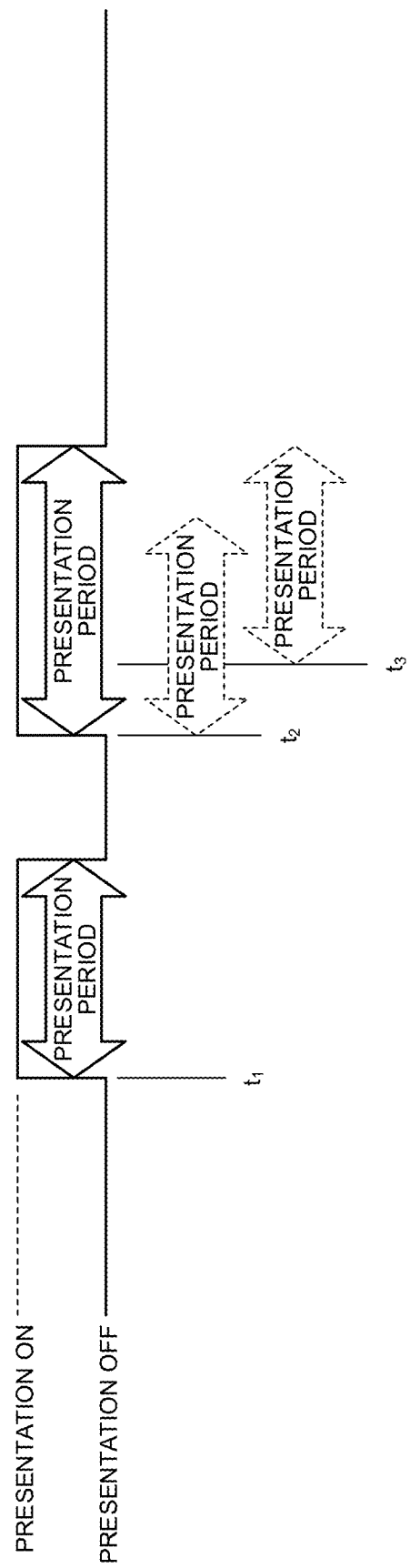

ASSISTANCE INFORMATION TO BE ORIGINALLY PRESENTED

CHANGE PRESENCE OR ABSENCE OF ASSISTANCE INFORMATION TO BE PRESENTED

ASSISTANCE INFORMATION TO BE ORIGINALLY PRESENTED

CHANGE THE NUMBER OF PIECES (AMOUNT) OF ASSISTANCE INFORMATION TO BE PRESENTED

ASSISTANCE INFORMATION TO BE ORIGINALLY PRESENTED

CHANGE TYPE OF ASSISTANCE INFORMATION TO BE PRESENTED

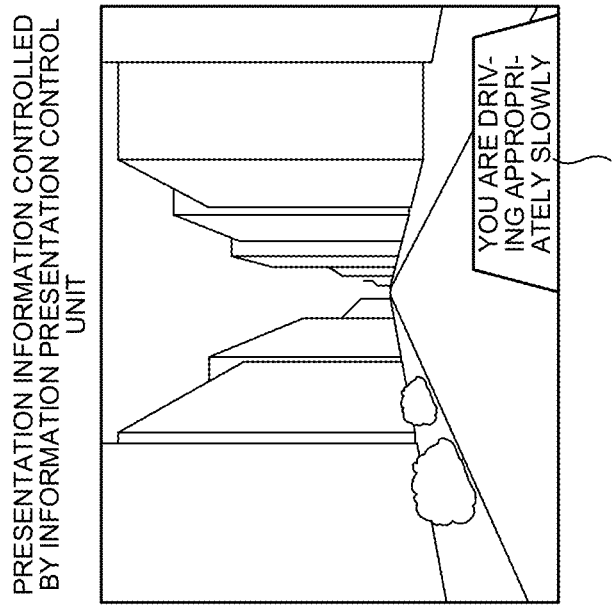
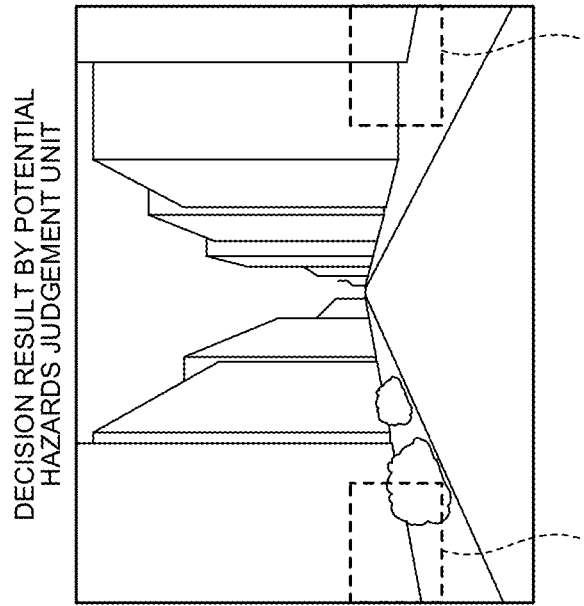

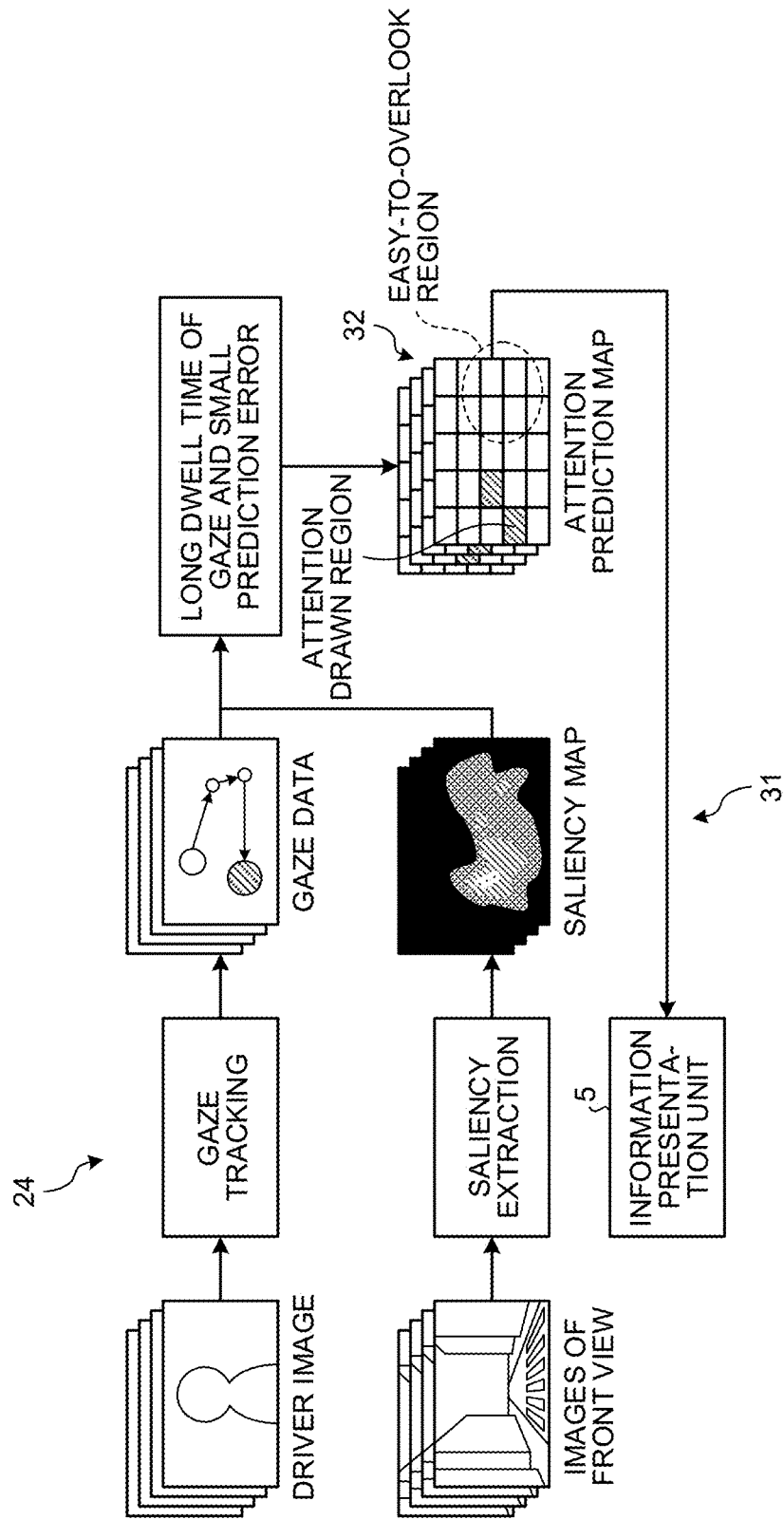

DRIVING ASSISTANCE DEVICE, DRIVING ASSISTANCE METHOD, AND RECORDING MEDIUM

CROSS-REFERENCE TO RELATED APPLICATIONS

This application is a continuation of International Application No. PCT/JP2022/035540, filed on Sep. 22, 2022, which claims the benefit of priority of the prior Japanese Patent Application No. 2021-195012, filed on Nov. 30, 2021, the entire contents of which are incorporated herein by reference.

FIELD

The present disclosure relates generally to a driving assistance device, a driving assistance method, and a recording medium.

BACKGROUND

A driver of a mobile body, such as a vehicle, drives the vehicle in accordance with traffic regulations while paying attention to a pedestrian, an obstacle, and the like based on a traffic light, a road sign, a lane, etc.

The road situation on which the vehicle is traveling changes from moment to moment. Thus, if information for assisting driving can be presented according to the change in the road situation, it is possible to contribute to safe driving and the like.

There is a patent literature (for example, JP 2019-096109 A) disclosing a driving assistance device that is intended to appropriately provide assistance information to be provided for a next driving scene in accordance with a traffic environment around an ego vehicle.

In such a driving assistance device, a controller estimates the timing of the cognitive behavior of the driver with respect to the next driving scene by using at least information related to the driving operation by the driver, and provides assistance information corresponding to the next driving scene before the estimated timing of the cognitive behavior. At this time, the controller estimates a required driving ability required of the driver in accordance with the traffic environment around the ego vehicle, and provides a reduced amount of assistance information as the required driving ability is higher (as the traffic environment is complicated). As a result, it is possible to provide the assistance information according to the traffic environment around the ego vehicle.

However, in the above-described driving assistance device, the assistance information is provided at a predetermined timing. Therefore, the provision of the assistance information is so to speak fixed, so that there is a problem that it is actually difficult to present the appropriate driving assistance information according to the surrounding situation.

SUMMARY

A driving assistance device according to the present disclosure includes a hardware processor connected to a memory. The hardware processor is configured to detect a latent recognition region being unconsciously recognized by a human in an entire imaging region of a captured image captured by an external camera provided in a mobile body. The captured image is an image of at least a traveling direction in which the mobile body travels. The latent recognition region is detected based on a predetermined feature value included in the captured image. The hardware processor is configured to present predetermined driving assistance information in a region on a display device. The region is estimated in accordance with the detected latent recognition region.

BRIEF DESCRIPTION OF THE DRAWINGS

FIGS. 13A and 13B are diagrams illustrating other display examples of driving assistance information;

FIGS. 14A and 14B are diagrams illustrating examples of presenting driving assistance information by voice;

FIG. 17 is a diagram illustrating an example that a divided region of a prediction error exceeding a threshold value is not generated as a whole;

FIG. 18 is a diagram for describing a period of time to present driving assistance information;

FIGS. 26A and 26B are diagrams illustrating presentation examples of driving assistance information presented when a driver executes "defensive driving";

FIG. 36 is a schematic diagram illustrating a procedure until when the driving assistance device according to the eighth embodiment presents driving assistance information based on saliency and dwell time of a gaze.

DETAILED DESCRIPTION

A driving assistance device according to an exemplary embodiment of the present disclosure will be described below. The driving assistance device of the embodiment is useful for driving assistance of flight vehicles, ships, etc. as well as vehicles such as a normal vehicle and a cargo vehicle. The driving assistance device is also useful for driving assistance of a mobile body with a remote operation, on which a person does not get. Hereinafter, a configuration and an effect of a driving assistance device according to an embodiment will be described by taking driving assistance for a driver of a vehicle as an example. In the case of providing driving assistance for other mobile bodies such as flight vehicles and vessels, refer to the following description.

Overview

Figure 1:
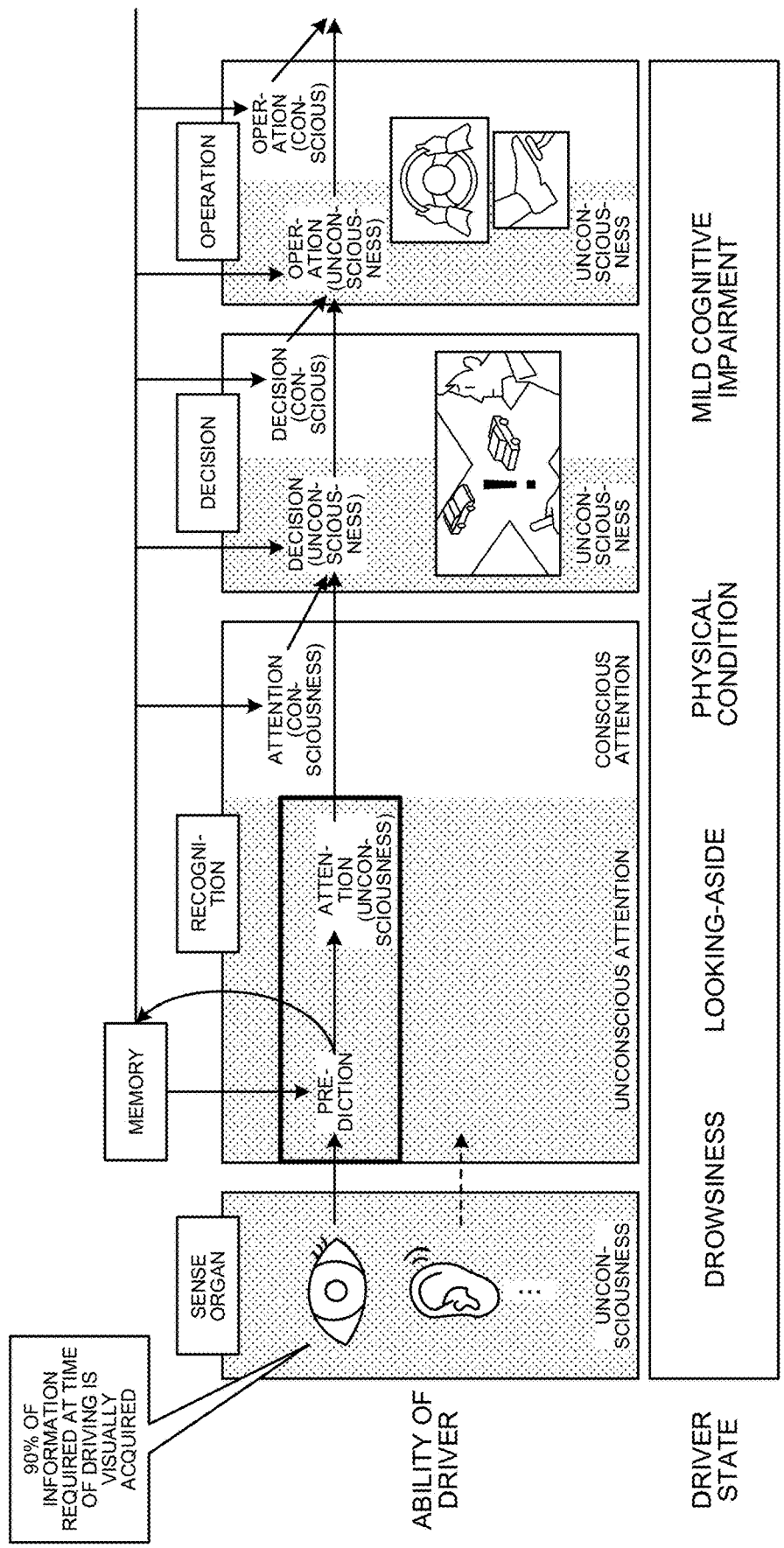
FIG. 1 is a schematic diagram illustrating a procedure from when a driver senses a situation around a vehicle by his/her sense such as vision and hearing to when the driver operates the vehicle.

FIG. 1 is a schematic diagram illustrating a procedure from when a driver senses a situation around a vehicle to when the driver operates the vehicle. As illustrated in FIG. 1, a driver who drives a vehicle senses a situation around the vehicle based on senses such as vision and hearing. 90% of information necessary for driving the vehicle is obtained from vision. When the information necessary for driving is obtained visually or the like in this manner, the driver unconsciously predicts the situation around the very close future of the vehicle based on memories for, for example, the past several seconds and the information necessary for driving obtained from visual sense. Then, due to the difference between the prediction result predicted unconsciously and reality, "unconscious attention" works. "Conscious attention" also works based on information necessary for driving obtained from vision or the like in addition to this unconscious attention.

The human is driving with recognition, decision, and operation. Recognition combines unconscious attention due to prediction with conscious attention based on memory such as traffic rules, without awareness. Decision is made by combining unconscious decision such as avoiding hazard with conscious decision based on memories of similar traffic situations in the past without being aware of them. Operation also combines unconscious operation acquired in past driving experiences with conscious operation based on memories of similar traffic situations in the past without awareness.

The driving assistance device according to the embodiment detects a point where the above-described "unconscious attention" is working in the surroundings of the vehicle sensed by the driver. Then, a point that is easily overlooked by the driver is identified based on the detection result, and information presentation (character, image, sound, or the like) for calling the driver's conscious attention is performed. As a result, it is possible to provide appropriate driving assistance according to the situation around the vehicle.

Additionally, "danger" while the vehicle is traveling is classified into two types of "revealed danger (hazards at that time)" and "unrevealed danger (potential hazards)". Moreover, according to cognitive psychology such as predictive coding theory, for example, "danger" is classified into two types of "danger that is easy for humans to overlook" and "danger that is difficult for humans to overlook" from human cognitive characteristics.

Meanwhile, when the "unrevealed danger (potential hazards)" is detected, all the detected "unrevealed danger (potential hazards)" is presented to the driver. In this case, even when the detected "unrevealed danger (potential hazards)" is a "danger that is difficult for humans to overlook", the detected "unrevealed danger (potential hazards)" is presented, and thus there is a concern that the driver feels annoyed. In addition, since the driver feels annoyed, there is a possibility that the driver's attention cannot be fully called even when the driving assistance information is presented ("power" of calling the driver's attention is weakened).

In order to prevent such an inconvenience, the driving assistance device according to the embodiment selectively presents a "danger that is easy for humans to overlook" out of "unrevealed danger (potential hazards)". As a result, it is possible to appropriately raise the driver's attention without bothering the driver and contribute to safe driving.

First Embodiment

Hardware Configuration

Figure 2:
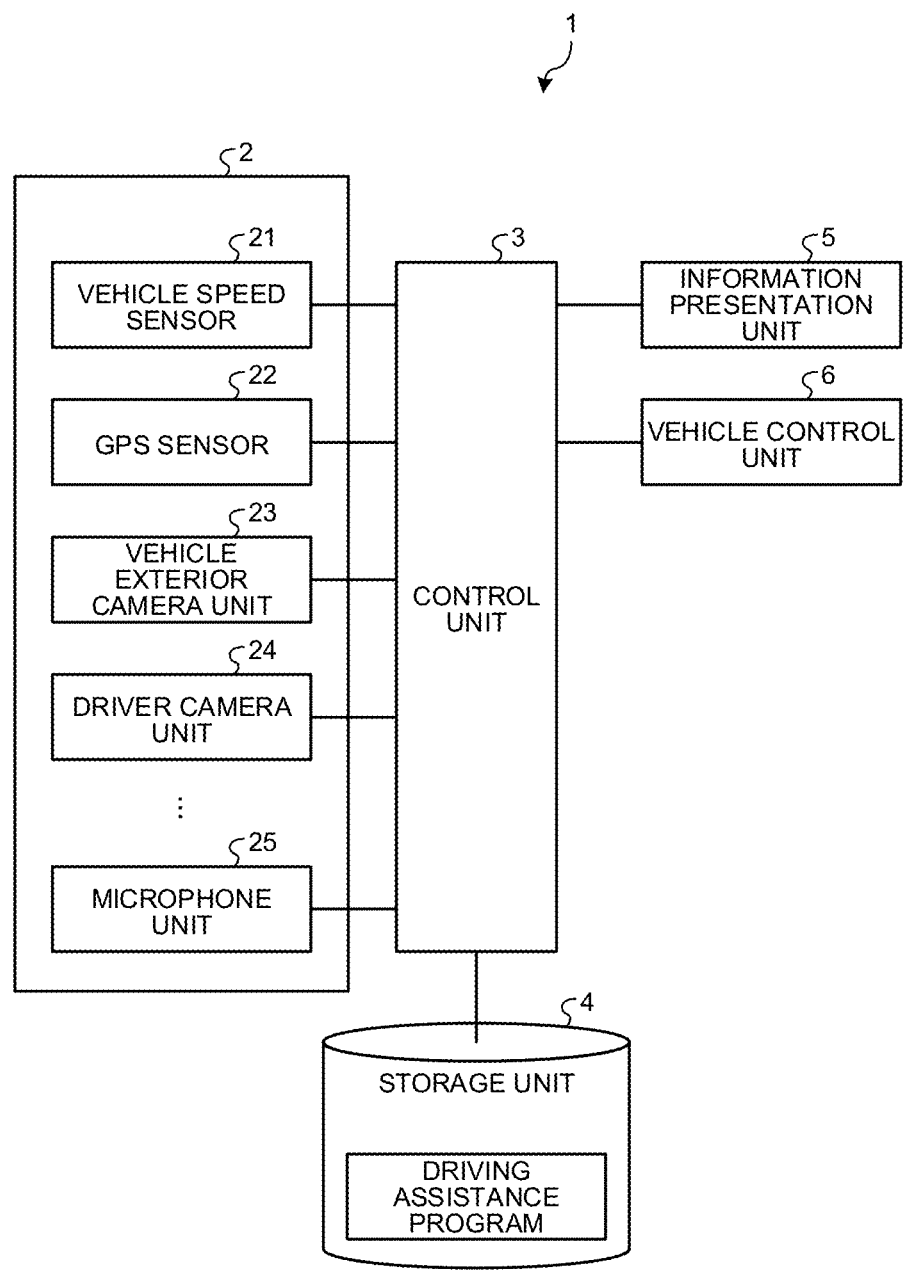
FIG. 2 is a block diagram illustrating a hardware configuration of the driving assistance device according to the first to eighth embodiments.

FIG. 2 is a block diagram illustrating a hardware configuration of a driving assistance device 1 of the first embodiment. As illustrated in FIG. 2, the driving assistance device 1 includes a detection device 2, a control unit 3, a storage unit 4, an information presentation unit 5, and a vehicle control unit 6.

The detection device 2 is a device that mainly detects a situation around the vehicle, and includes, for example, a vehicle speed sensor 21 (an example of a movement speed detection unit or a speed detection sensor) that detects a traveling speed of the vehicle, and a global positioning system (GPS) sensor 22 that detects a geographical current position of the vehicle. Detection device 2 mainly includes vehicle exterior camera unit 23 (an example of an external camera unit) that captures an image of a landscape in front of the vehicle in a traveling direction, and a driver camera unit 24 that captures an image of a driver who drives the vehicle. The captured image of the face of the driver captured by the driver camera unit 24 is mainly used for detecting the gaze of the driver. In addition, the detection device 2 includes a microphone unit 25 that collects sound outside the vehicle.

The storage unit 4 stores a driving assistance program for presenting driving assistance information for supporting driving of the driver. The driving assistance information is presented on the information presentation unit 5 by the control unit 3 in accordance with the driving assistance program. Specifically, when the information presentation unit 5 is a display unit (an example of a display device), the control unit 3 controls the display unit to display the driving assistance information. Alternatively, the information presentation unit 5 may be a speaker unit. In this case, the control unit 3 performs audio output control of the driving assistance information via the speaker unit. Note that such display control and audio output control of the driving assistance information may be used in combination.

The vehicle control unit 6 is an example of an operation control unit, and for example, when the vehicle is traveling at a position where danger is predicted at a traveling speed equal to or higher than a predetermined traveling speed, the vehicle control unit 6 brakes and controls the vehicle to suppress the traveling speed, thereby ensuring safety.

Functional Configuration

Figure 3:
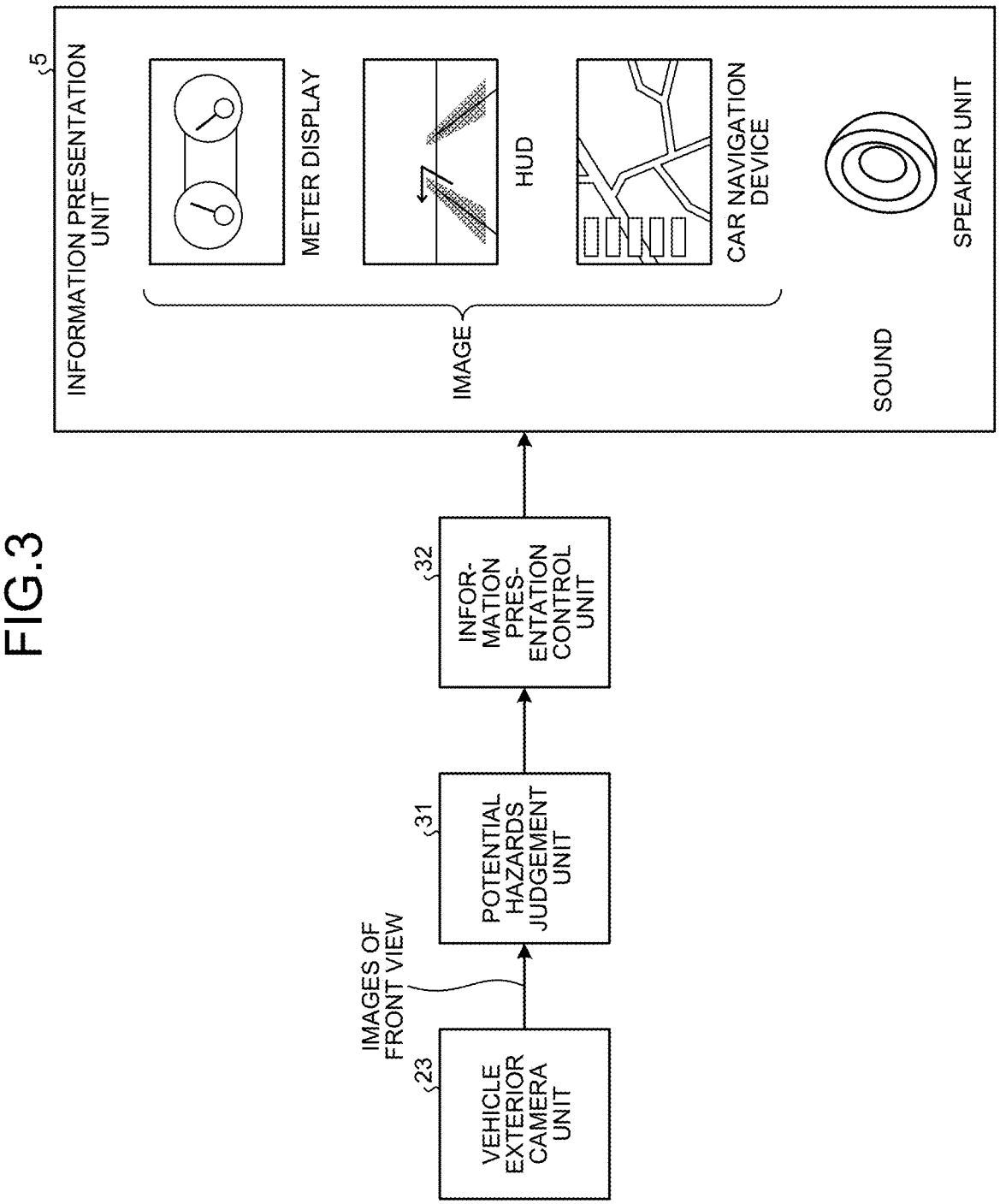
FIG. 3 is a functional block diagram of each function implemented by a control unit of the driving assistance device according to the first embodiment executing a driving assistance program stored in a storage unit.

FIG. 3 is a functional block diagram illustrating each function realized by the control unit 3 executing the driving assistance program stored in the storage unit 4. As illustrated in FIG. 3, the control unit 3 functions as a potential hazards judgement unit 31 and an information presentation control unit 32 by executing the driving assistance program.

The potential hazards judgement unit 31 is an example of a detection unit, and determines (detects) a latent recognition region unconsciously recognized by a human in the entire imaging region of the captured image based on the captured image (images of a front view) of the vehicle in the traveling direction captured by the vehicle exterior camera unit 23. The information presentation control unit 32 presents predetermined driving assistance information in a region on the information presentation unit estimated from the latent recognition region detected by the potential hazards judgement unit 31. For example, a meter display device of a vehicle, a head-up display (HUD) device, a monitor device of a car navigation device, or the like can be used as the information presentation unit 5 in a case where the driving assistance information is presented by an image or a video. Moreover, in a case where the driving assistance information is presented by voice (in addition to voice messages, electronic sounds and the like are also included), a speaker unit can be used as the information presentation control unit 32.

Note that, in this example, the potential hazards judgement unit 31 and the information presentation control unit 32 are realized by software by a driving assistance program. However, all or some of them may be realized by hardware such as an integrated circuit (IC).

In addition, the driving assistance program may be provided by being recorded as file information in an installable format or an executable format in a computer device-readable recording medium such as a CD-ROM or a flexible disk (FD). The driving assistance program may be provided by being recorded in a computer device-readable recording medium such as a CD-R, a digital versatile disk (DVD), a Blu-ray (registered trademark) disk, or a semiconductor memory. In addition, the driving assistance program may be provided in a form of being installed via a network such as the Internet. The driving assistance program may be provided by being incorporated in a ROM or the like in the device in advance.

Operation to Present Driving Assistance Information

Figure 4:
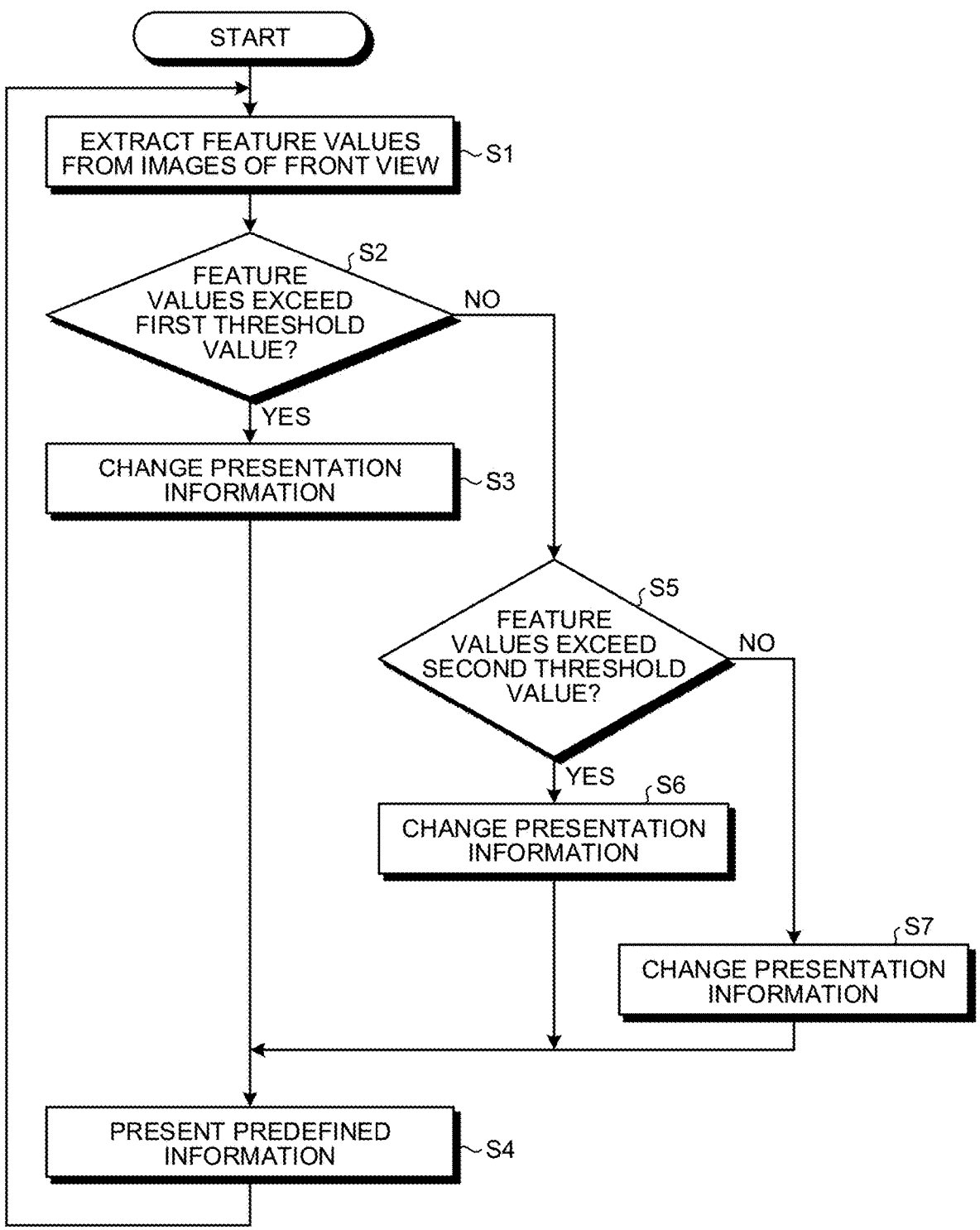
FIG. 4 is a flowchart for describing a presentation operation of driving assistance information.

FIG. 4 is a flowchart for describing a presentation operation of driving assistance information. First, in step S1, the potential hazards judgement unit 31 illustrated in FIG. 3 divides the images of the landscape in front of the vehicle captured by the vehicle exterior camera unit 23 into, for example, a total of twenty-five divided regions of 5×5 in height×width, and extracts the "feature value" for each of the divided regions.

As an example, a prediction error amount detected for each divided region can be used as the "feature value". In addition, saliency indicating a ratio of the edge of the object for each divided region can be used as the "feature value". In addition, the prediction error and the saliency can be used in combination. Hereinafter, a case where only the prediction error amount is used as the "feature value" will be described, and the saliency and the like will be described later.

Figure 5:
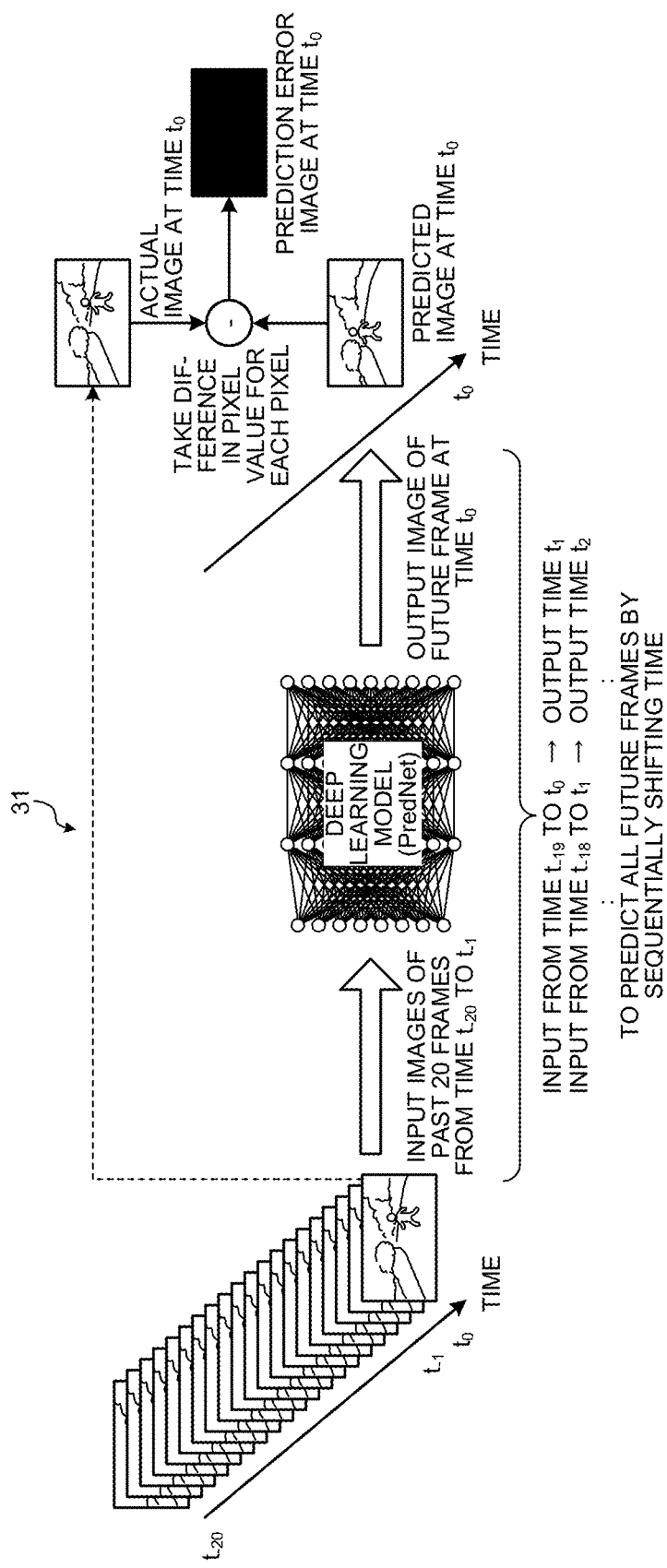
FIG. 5 is a schematic diagram illustrating a procedure of operation of generating a prediction error image.

FIG. 5 is a schematic diagram for describing operation of generating a prediction error image by the potential hazards judgement unit 31. As illustrated in FIG. 5, the potential hazards judgement unit 31 generates a predicted images based on "PredNet", which is a deep learning prediction model constructed in a framework of deep learning, by simulating processing of predictive coding in the cerebral cortex. Specifically, as illustrated in FIG. 5, when the past images for 20 frames captured by the vehicle exterior camera unit 23 are supplied, the potential hazards judgement unit 31 generates a predicted images corresponding to a future frame based on the deep learning prediction model.

"PredNet" is detailed in the document "Lotter, W., Kreiman, G., and Cox, D., "Deep predictive coding networks for video prediction and unsupervised learning", https://arxiv.org/abs/1605.08104".

When the past images from time $t_{-20}$ to time $t_{-1}$ illustrated in FIG. 5 are supplied, the potential hazards judgement unit 31 generates a predicted images of a future frame at time to based on the deep learning prediction model. Similarly, the potential hazards judgement unit 31 generates a predicted images of a future frame at time $t_1$ based on the deep learning prediction model from the past images from time $t_{-19}$ to time to. Similarly, the potential hazards judgement unit 31 generates a predicted images of a future frame at time $t_2$ from the past images from time $t_{-18}$ to time $t_{-1}$ based on the deep learning prediction model.

The potential hazards judgement unit 31 generates predicted images of all future frames by using the past images whose captured time are shifted by one frame as described above.

Additionally, the potential hazards judgement unit 31 compares the generated predicted images with a real image (actual image) actually captured by the vehicle exterior camera unit 23 at the time of the generated predicted images in units of pixels, and generates a prediction error image based on a difference between the respective pixel values of both images. The example of FIG. 5 illustrates an example that the prediction error image at time to is generated based on the difference between the pixel values of the predicted images at time to and the real image (actual image). The value of each pixel of the prediction error image indicates the value of the prediction error.

Next, when the prediction error image is generated in this way, the potential hazards judgement unit 31 divides the entire image region of the generated predicted images into a total of twenty-five divided regions of, for example, 5×5 in height×width. Then, the potential hazards judgement unit 31 detects the sum of the values of the prediction errors, which are the values of the respective pixels, for each divided region. Note that the number of frames of the past image used for the calculation of the prediction error may be any number of frames according to design or the like, for example, 30 frames.

Figure 6:
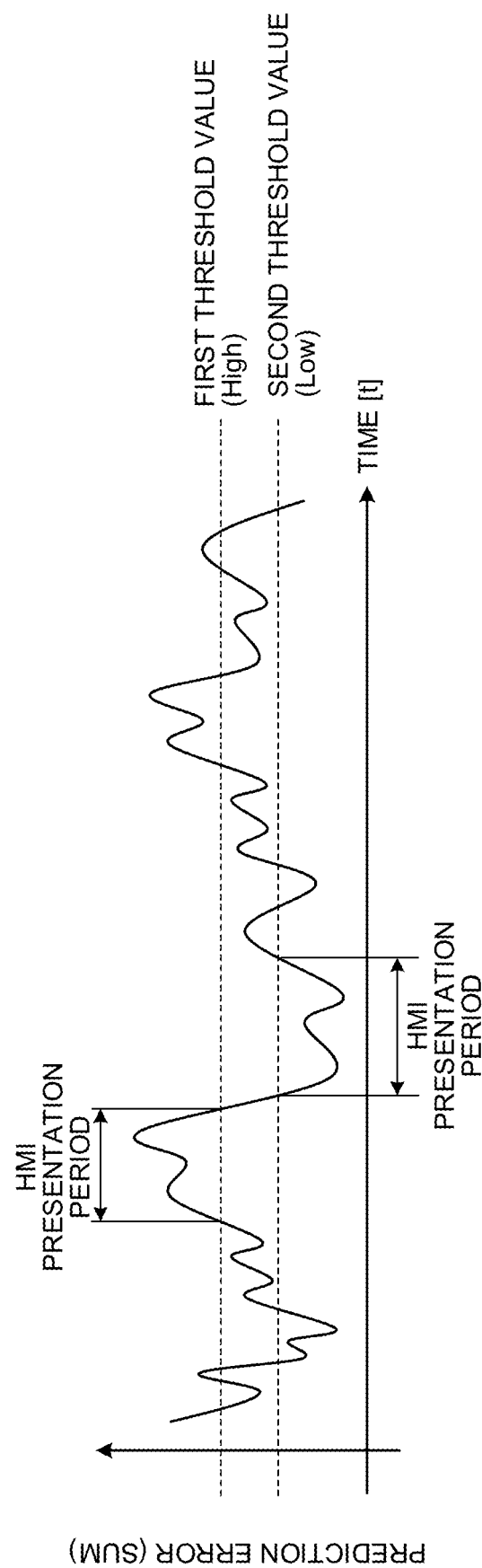
FIG. 6 is a diagram illustrating a first threshold value (High) for an upper limit value of the sum of prediction errors and a second threshold value (Low) for a lower limit value of the sum of prediction errors.

Next, in step S2 of FIG. 4, the potential hazards judgement unit 31 compares the sum of the prediction errors of each divided region with a first threshold value (High) for an upper limit value of the sum of the prediction errors illustrated in FIG. 6. In step S5 of FIG. 4, the potential hazards judgement unit 31 compares the sum of the prediction errors of each divided region with a second threshold value (Low) for a lower limit value of the sum of the prediction errors illustrated in FIG. 6. Then, from among the respective divided regions, a divided region having a sum of prediction errors exceeding a first threshold value (High) and a divided region having a sum of prediction errors less than a second threshold value (Low) are detected. The first threshold value and the second threshold value illustrated in FIG. 6 are examples of the prediction error threshold value.

A case where the sum of the prediction errors exceeds the first threshold value (High) means that the divided region is a region where the driver is unconsciously conscious. On the other hand, a case where the sum of the prediction errors is less than the second threshold value (Low) means that the divided region is a region where the driver is not conscious even unconsciously.

The information presentation control unit 32 changes the driving assistance information (presentation information) to be presented based on the divided region having the sum of the prediction errors exceeding the first threshold value (High) (step S2: Yes and step S3). In addition, the information presentation control unit 32 changes the driving assistance information (presentation information) to be presented based on the divided region having the sum of the prediction errors less than the second threshold value (Low) (step S5: Yes and step S6). In addition, the information presentation control unit 32 changes the driving assistance information (presentation information) to be presented based on the divided region having the sum of the prediction errors that are less than the first threshold value (High) and less than the second threshold value (Low) (step S5: No and step S7).

Then, the information presentation control unit 32 presents the driving assistance information, which has been changed at step S3, step S6, or step S7, on the information presentation unit 5 (step S4).

Figure 7:
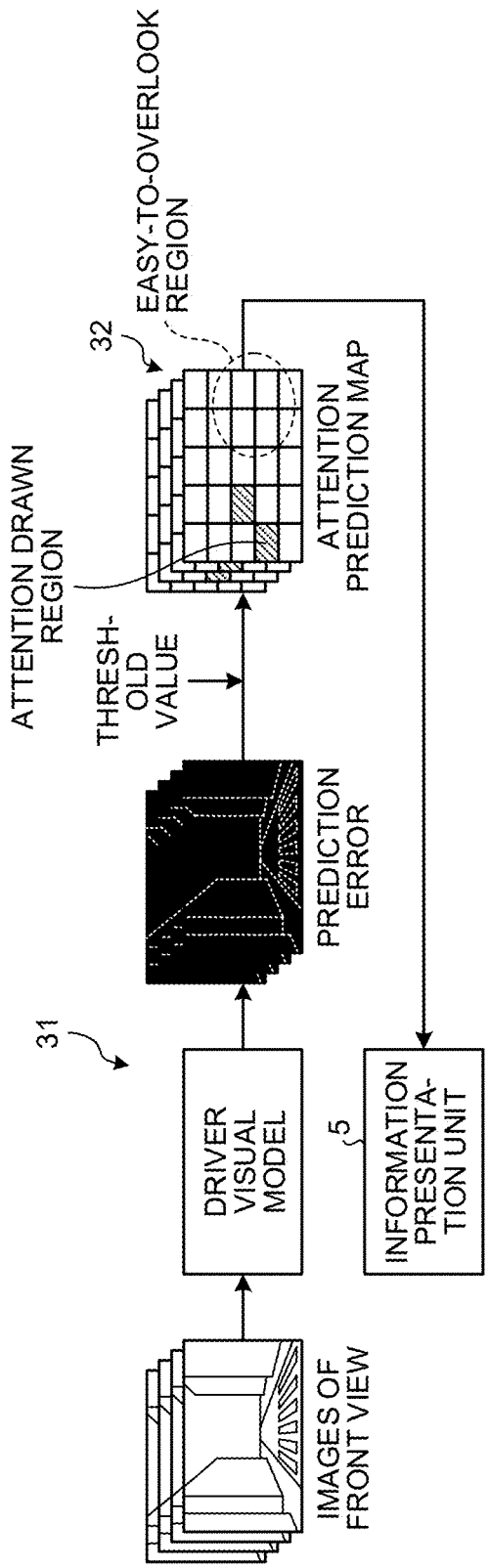
FIG. 7 is a diagram schematically illustrating a procedure until when driving assistance information is displayed on an information presentation unit.

FIG. 7 is a diagram schematically illustrating a procedure until when the driving assistance information is displayed on the information presentation unit 5. As illustrated in FIG. 7, predicted images are generated based on the deep learning prediction model (or driver visual model) by using a plurality of images of a front view captured by the vehicle exterior camera unit 23, and a prediction error image is generated by taking a difference from the images of a front view at the same time. Hereinafter, in order to simplify the description, the driver visual model is described to output a prediction error image. From among the respective divided regions of the prediction error image, a divided region having a sum of prediction errors exceeding a first threshold value (High) and a divided region having a sum of prediction errors less than a second threshold value (Low) are detected. Then, the driving assistance information is presented on the information presentation unit 5 based on the detection result.

Note that the deep learning prediction model is described in detail in, for example, "Kato, Emura, and Watanabe, "Factor analysis of traffic near miss events using deep learning simulating human vision", proceedings of the Japan Society of Automotive Engineers, 2021 spring meeting".

Figure 8:
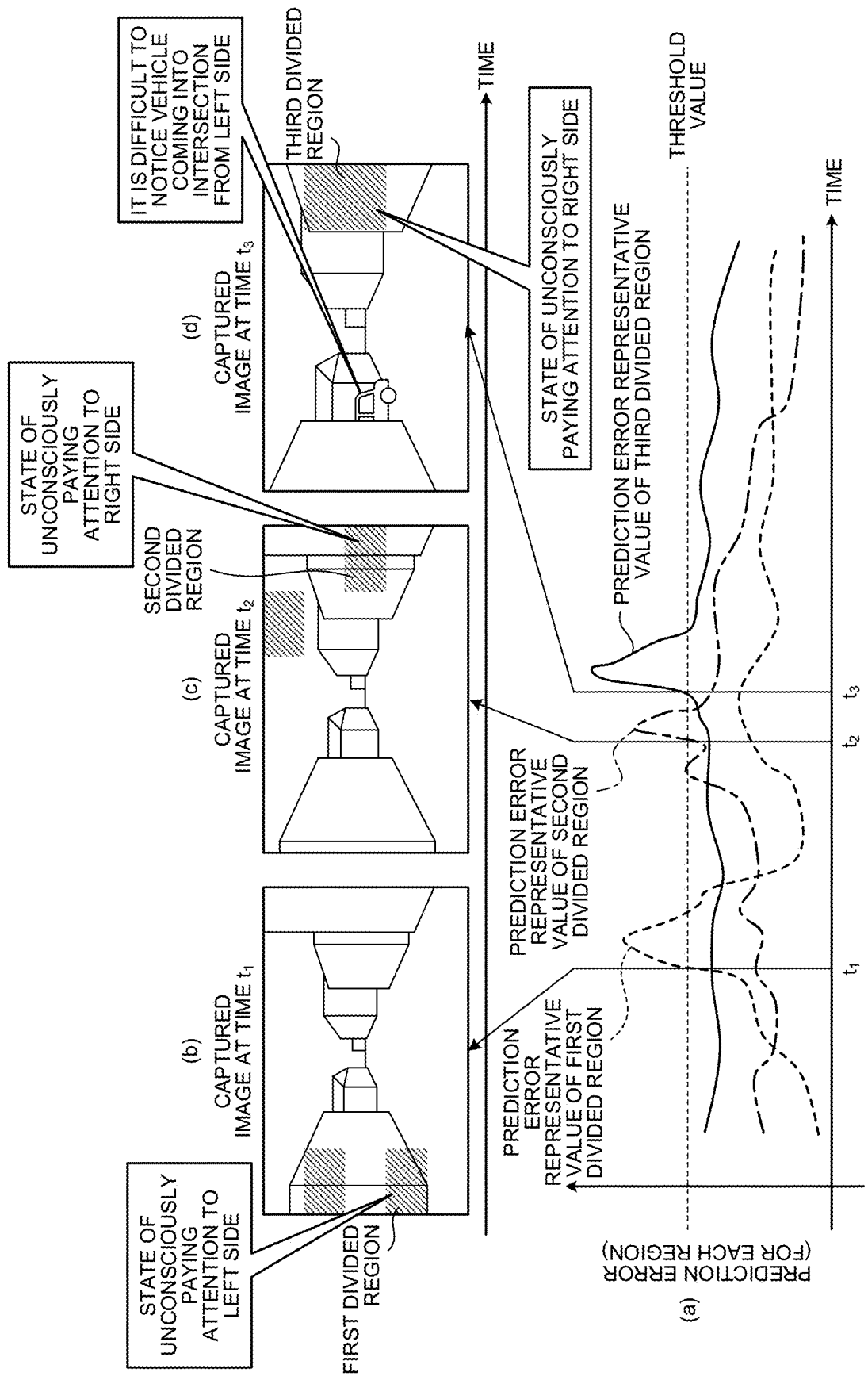
FIG. 8 is a diagram for describing a disadvantage in a case where driving assistance information is not presented.

FIG. 8 is a diagram for describing inconvenience in a case where the driving assistance information is not presented. In graph indications (a) of FIG. 8, a dotted line graph indicates the transition of the value of the prediction error of the first divided region, a dashed-dotted line graph indicates the transition of the value of the prediction error of the second divided region, and a solid line graph indicates the transition of the value of the prediction error of the third divided region. An image (b) in FIG. 8 is a captured image at time $t_1$ when the value of the prediction error of the first divided region exceeds the first threshold value (High). An image (c) in FIG. 8 is a captured image at time $t_2$ when the value of the prediction error of the second divided region exceeds the first threshold value (High). An image (d) in FIG. 8 is a captured image at time $t_3$ when the value of the prediction error of the third divided region exceeds the first threshold value (High).

As shown in the image (b) in FIG. 8, at time $t_1$, the first divided region having the value of the prediction error exceeding the first threshold value (High) is present on the left side, so that the driver unconsciously pays attention to the left side. Next, as shown in the image (c) in FIG. 8, at time $t_2$, the second divided region having the value of the prediction error exceeding the first threshold value (High) is present on the right side, so that the driver unconsciously pays attention to the right side. Similarly, as shown in the image (d) in FIG. 8, at time $t_3$, the third divided region having the value of the prediction error exceeding the first threshold value (High) is present on the right side, so that the driver unconsciously pays attention to the right side. The driver is less likely to notice another vehicle appearing from the left side as shown in the image (d) in FIG. 8 while unconsciously paying attention to the right side.

Figure 9:
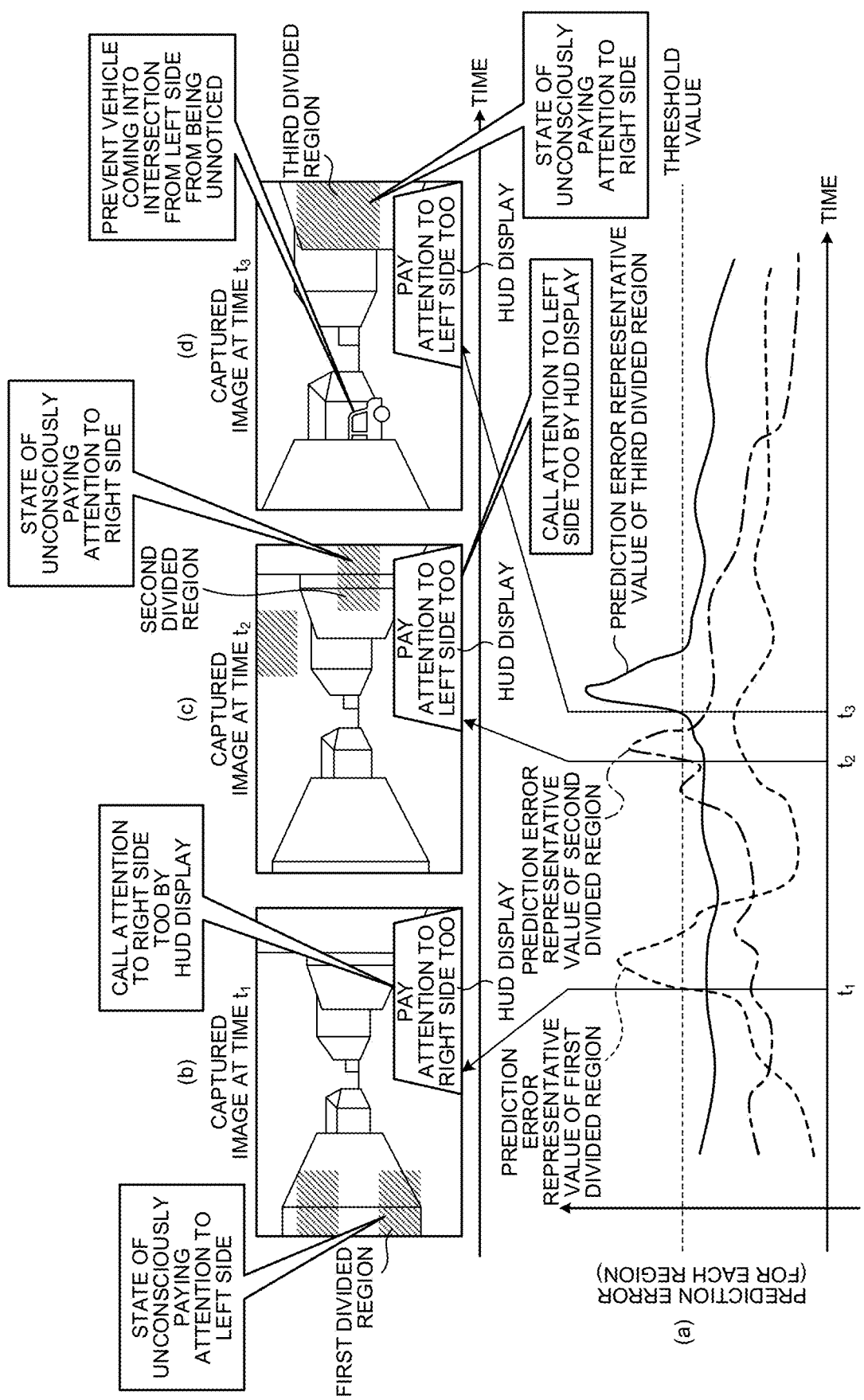
FIG. 9 is a diagram illustrating a presentation example of driving assistance information in the driving assistance device according to the embodiment.

On the other hand, FIG. 9 is a diagram illustrating a presentation example of driving assistance information in the driving assistance device 1 according to the embodiment. In graph indications (a) of FIG. 9, a dotted line graph indicates the transition of the value of the prediction error of the first divided region, a dashed-dotted line graph indicates the transition of the value of the prediction error of the second divided region, and a solid line graph indicates the transition of the value of the prediction error of the third divided region. An image (b) in FIG. 9 is a captured image at time $t_1$ when the value of the prediction error of the first divided region exceeds the first threshold value (High). An image (c) in FIG. 9 is a captured image at time $t_2$ when the value of the prediction error of the second divided region exceeds the first threshold value (High). An image (d) in FIG. 9 is a captured image at time $t_3$ when the value of the prediction error of the third divided region exceeds the first threshold value (High).

As shown in the image (b) in FIG. 9, at time $t_1$, the first divided region having the value of the prediction error exceeding the first threshold value (High) is present on the left side, so that the driver unconsciously pays attention to the left side. In this case, the information presentation control unit 32 presents driving assistance information of "pay attention to the right side too" on the display screen of the HUD, for example, so that the driver pays attention to the right side too.

In addition, as shown in the image (c) in FIG. 9, at time $t_2$, the second divided region having the value of the prediction error exceeding the first threshold value (High) is present on the right side, so that the driver unconsciously pays attention to the right side. In this case, the information presentation control unit 32 presents the driving assistance information of "pay attention to the left side too" on the display screen of the HUD, for example, so that the driver pays attention to the left side.

In addition, as shown in the image (d) in FIG. 9, at time $t_3$, the third divided region having the value of the prediction error exceeding the first threshold value (High) is present on the right side, so that the driver unconsciously pays attention to the right side. In this case, the information presentation control unit 32 presents the driving assistance information of "pay attention to the left side too" on the display screen of the HUD, for example, so that the driver pays attention to the left side. As a result, the driver can notice another vehicle appearing from the left side as shown in the image (d) in FIG. 9, and can avoid inconvenience such as collision by the driving operation.

Figure 10:
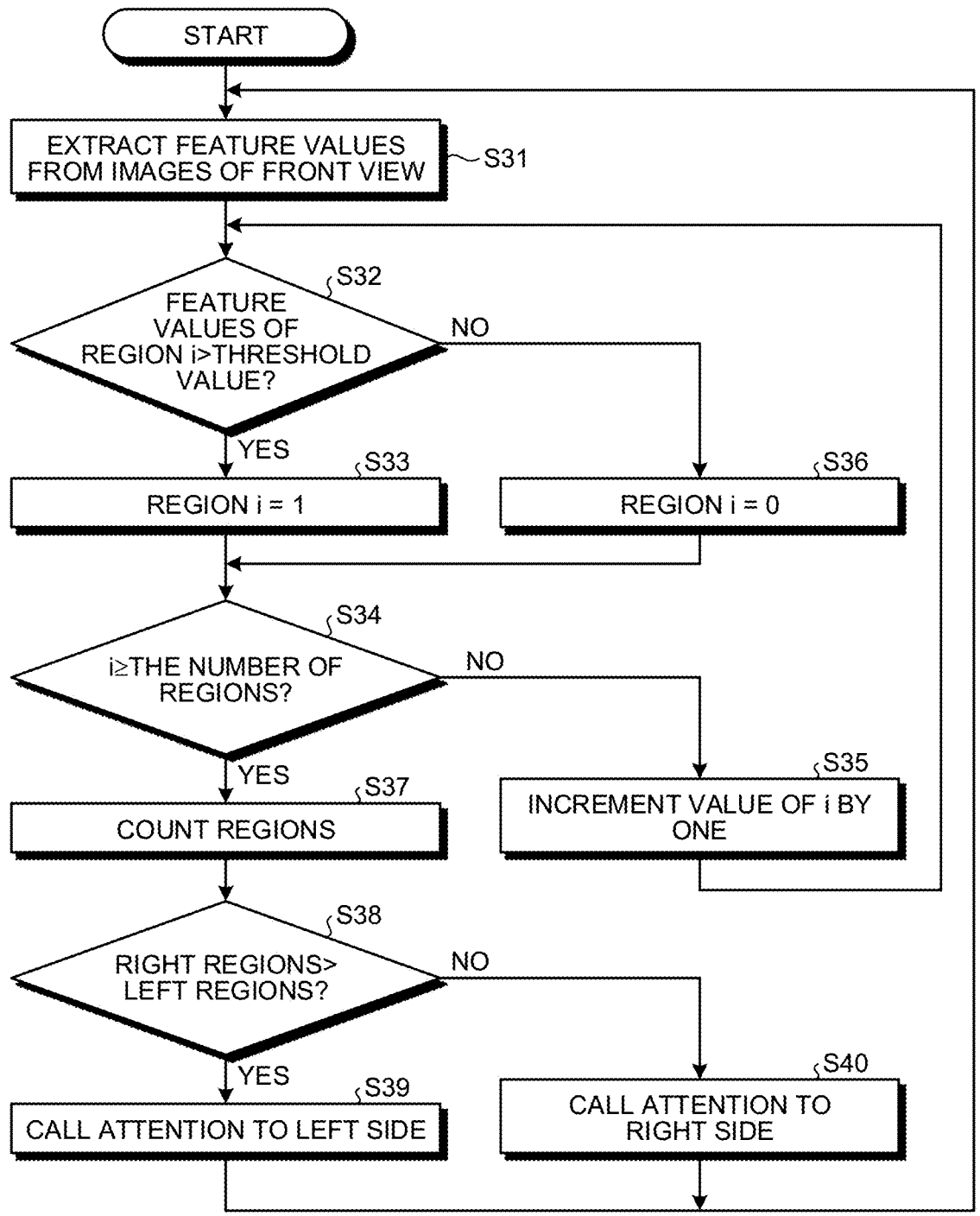
FIG. 10 is a flowchart for describing operation of determining a display position of driving assistance information with respect to a position of a divided region having a large prediction error.

FIG. 10 is a flowchart illustrating a procedure for determining the display position of the driving assistance information with respect to the position of the divided region having a large prediction error. In step S31, the potential hazards judgement unit 31 extracts a prediction error which is an example of an extraction amount for each divided region of the captured image in front of the vehicle.

Next, in step S32, the information presentation control unit 32 determines whether the first threshold value (High) is exceeded for each divided region. Note that, for easy understanding, while an example of determining whether the first threshold value (High) is exceeded for each divided region will be described, the information presentation control unit 32 also determines whether the second threshold value (Low) is exceeded for each divided region.

Specifically, the information presentation control unit 32 applies a number "i" in an order from "0" to the divided region to be determined as to whether the first threshold value (High) is exceeded (step S33 or step S36). Then, the number to be applied to the respective divided regions is incremented one by one in step S35. The information presentation control unit 32 determines whether the feature values (value of the prediction error) exceed the first threshold value (High) for each divided region of each number (step S32).

Next, the information presentation control unit 32 determines whether the number applied to the divided region is equal to or larger than the number of all the divided regions (step S34). For example, the above example is an example that the entire region of the captured image is divided into twenty-five divided regions. In this case, in step S34, the information presentation control unit 32 determines whether the number "i" applied to the divided region while incrementing one by one has reached "25". A case where the number "i" applied to each divided region does not yet reach "25" (step S34: No) means that the determination for all the divided regions as to whether to exceed the first threshold value (High) is not finished. Therefore, the information presentation control unit 32 repeatedly executes the processing of steps S32 to S36 described above.

On the other hand, a case where the number "i" applied to each divided region reaches "25" means that the determination for all the divided regions as to whether to exceed the first threshold value (High) is finished. In this case, the information presentation control unit 32 counts the number of divided regions having the value of the prediction error exceeding the first threshold value (High) while dividing the divided regions into the left and right regions of the information acquisition screen based on the captured image (step S37). Then, the information presentation control unit 32 determines whether the number of the above-described divided regions located in the region on the right side of the information acquisition screen is larger than the number of the above-described divided regions located in the region on the left side of the information acquisition screen (step S38).

In the information presentation control unit 32, a case where the number of the above-described divided regions located in the right region of the information acquisition screen is larger than the number of the above-described divided regions located in the left region of the information acquisition screen means that the unconscious attention of the driver is biased with respect to the right region of the screen, and the driver easily overlooks the left region of the screen. In this case (step S38: Yes), the information presentation control unit 32 presents driving assistance information such as "pay attention to the left side too" via the information presentation unit 5 (step S39). As a result, it is possible to call driver's conscious attention to the left region that is easily overlooked by the driver.

On the other hand, a case where the number of the above-described divided regions located in the region on the right side of the information acquisition screen is smaller than the number of the above-described divided regions located in the region on the left side of the information acquisition screen means that the unconscious attention of the driver is biased with respect to the region on the left side of the screen, and the driver easily overlooks the region on the right side of the screen. In this case (step S38: No), the information presentation control unit 32 presents driving assistance information such as "pay attention to the right side too" via the information presentation unit 5 (step S40). As a result, it is possible to call driver's conscious attention to the right region that is easily overlooked by the driver.

Information Presentation Depending on Occurrence Scene of Prediction Error

Figure 11:
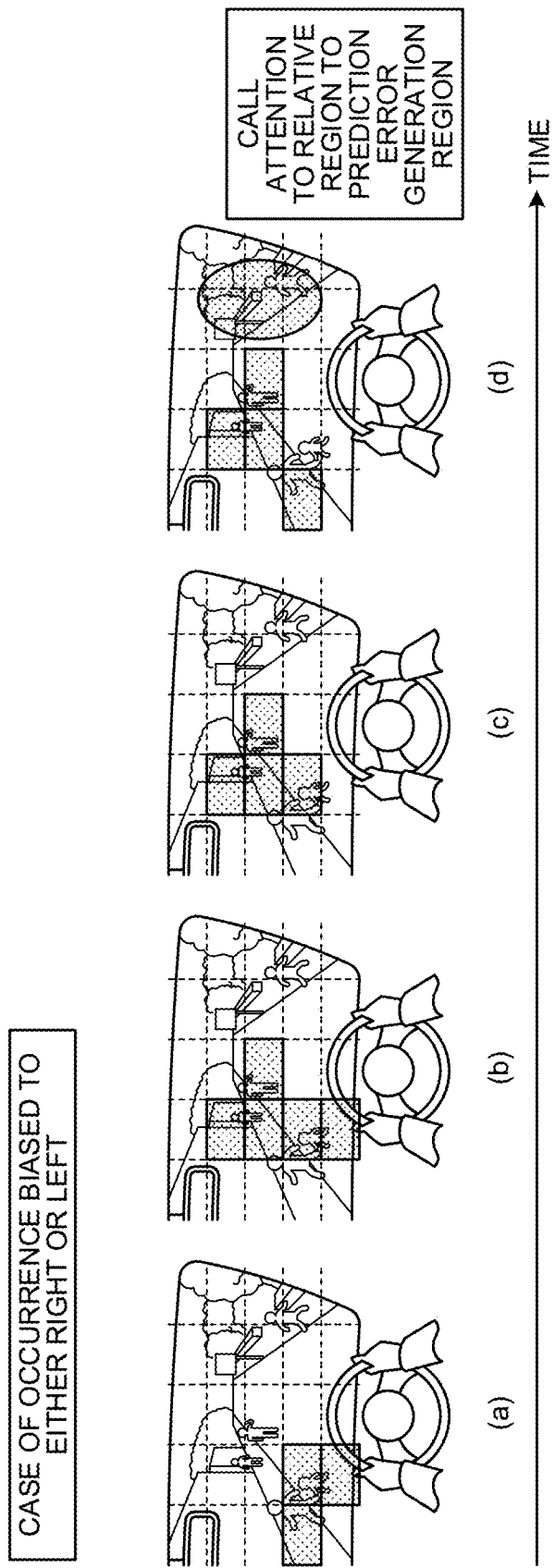
FIG. 11 is a diagram illustrating a case where many prediction errors occur unevenly on either the left or right of a screen for presenting driving assistance information.

Next, an example of information presentation depending on how the prediction error occurs will be described. FIG. 11 illustrates a case where prediction errors occur unevenly on either the left or right of the information acquisition screen. In time-series images (a) to (c) in FIG. 11, prediction errors tend to occur on the left side of the information acquisition screen. In such a case, the information presentation control unit 32 presents driving assistance information for calling the driver's attention on the right side of the information acquisition screen.

In addition, in a case where many prediction errors unevenly occur on the upper side of the information acquisition screen, the information presentation control unit 32 presents driving assistance information for calling the driver's attention on the lower side of the information acquisition screen. When many prediction errors occur unevenly on the right side of the information acquisition screen, the driving assistance information for calling the driver's attention is presented on the left side of the information acquisition screen. Accordingly, the information presentation control unit 32 presents the driving assistance information in the divided region that is the relative position with respect to the divided region where many prediction errors occur in the information acquisition screen.

Figure 12A:
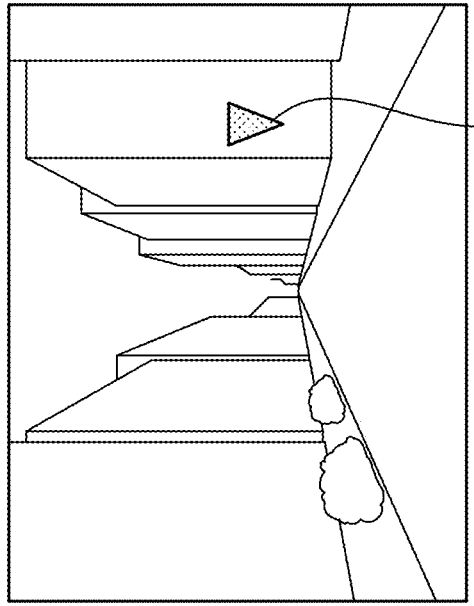
FIGS. 12A and 12B are diagrams illustrating display examples of driving assistance information.
Figure 12B:
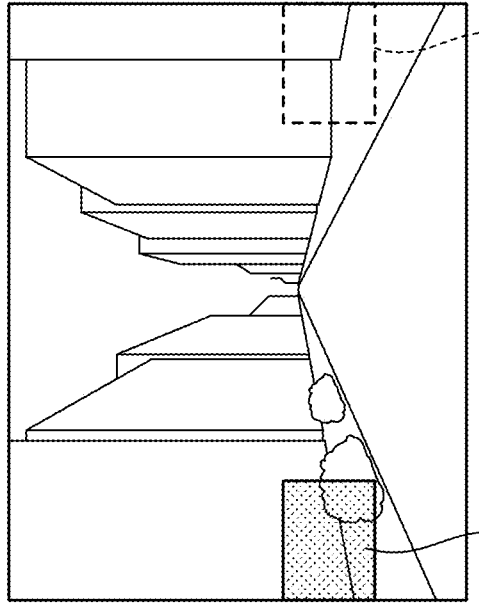

FIGS. 12A and 12B are diagrams illustrating display examples of driving assistance information. FIG. 12A illustrates an example that many prediction errors occur on the left side of the information acquisition screen. In this case, the information presentation control unit 32 may display, as illustrated in FIG. 12B, a yellow triangular icon or arrow on the right side of the information acquisition screen, which is easily overlooked by the driver, to call the driver's attention to the right side of the information acquisition screen.

FIGS. 13A and 13B are diagrams illustrating other display examples of the driving assistance information. FIG. 13A illustrates an example that many prediction errors occur on the left side of the information acquisition screen. In such a case, while, in the examples of FIGS. 12A and 12B, the driving assistance information for calling the driver's attention is displayed on the right side of the information acquisition screen, as illustrated in FIG. 13B, the driving assistance information for calling the driver's attention may be displayed at the center of the information acquisition screen. The example of FIG. 13B is an example that the information presentation control unit 32 displays a linear line extending in the depth direction from the left and right front sides of the information acquisition screen. By displaying such a line, the driver's attention can be called to the center of the information acquisition screen.

Note that a divided region where the value of the prediction error is less than the second threshold value (Low) illustrated in FIG. 6 means a divided region that is easily overlooked (attention is suppressed) by the driver. Such a divided region that is likely to be overlooked by the driver occurs, for example, in a case where the driver drives the ego vehicle following the preceding vehicle in a traffic jam. This means that attention by the driver to the vehicle in front of the ego vehicle is suppressed, and careless driving is performed. In this state, inconvenience such as collision with the forward vehicle may occur.

Therefore, by displaying the line illustrated in FIG. 13B, the information presentation control unit 32 guides the gaze of the driver to the center of the information acquisition screen to call attention. Alternatively, the information presentation control unit 32 presents driving assistance information (message or voice) such as "pay attention ahead" in the center of the information acquisition screen to guide the gaze of the driver to the center of the screen to call attention. As a result, it is possible to urge the driver to pay attention ahead, prevent inconvenience such as collision, and ensure safety.

FIGS. 14A and 14B are diagrams illustrating examples of presenting driving assistance information by voice. FIG. 14A illustrates an example that many prediction errors occur on the left side of the information acquisition screen. In this case, as illustrated in FIG. 14B, the information presentation control unit 32 presents a voice message such as "pay attention to the right side too" via the speaker unit. As a result, the driver's attention can be called to the right side of the information acquisition screen.

Figure 15:
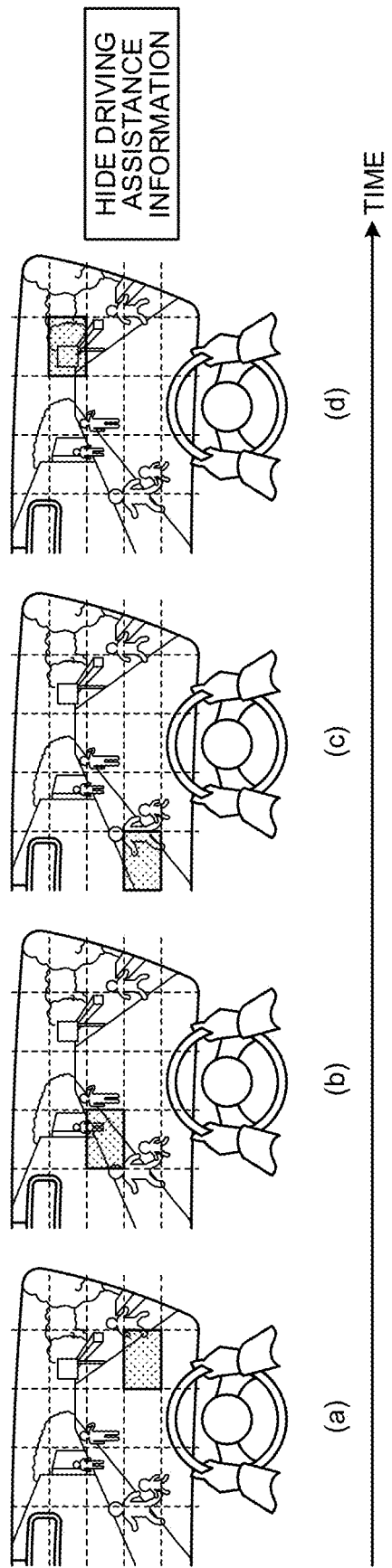
FIG. 15 is a view illustrating a case where there is no unevenness in prediction errors generated in each divided region of the information acquisition screen.

Time-series images (a) to (d) in FIG. 15 represent an example that there is no unevenness of prediction errors generated in each divided region of the information acquisition screen. In this case, the driver is paying an overall unconscious attention. Therefore, the information presentation control unit 32 does not present the driving assistance information.

Figure 16:
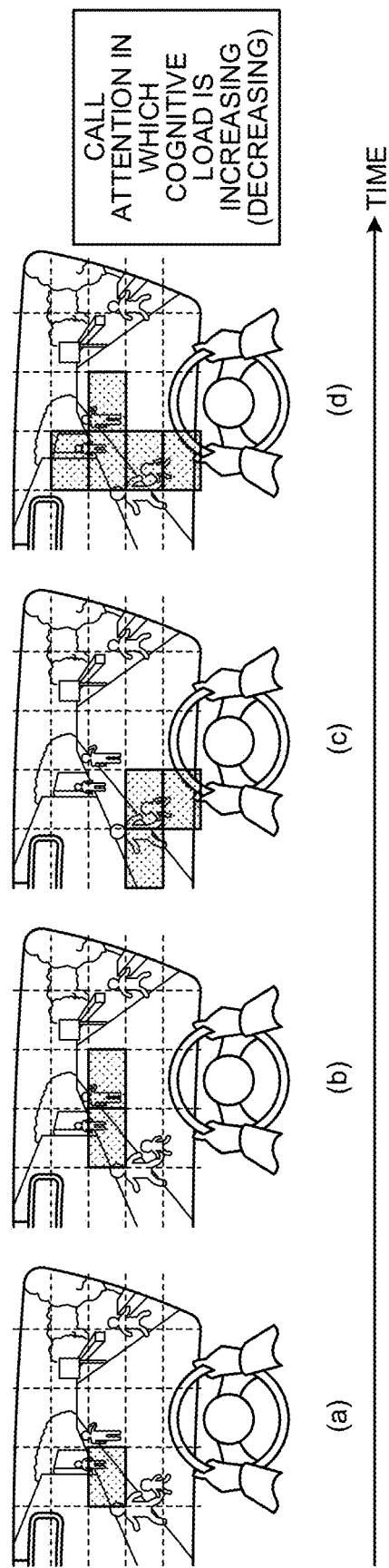
FIG. 16 is a diagram illustrating an example that the number of divided regions in which a prediction error exceeding a threshold value occurs gradually increases.

Time-series images (a) to (d) in FIG. 16 represent an example that the number of the divided regions where the prediction error exceeding the threshold value gradually increases. In this case, the cognitive load of the driver is increasing. Therefore, the information presentation control unit 32 presents driving assistance information indicating that the cognitive load is increasing.

In addition, the same applies to the opposite case, and in a case where the number of the divided regions where the prediction error exceeding the threshold value gradually decreases, this indicates that the value of the prediction error of each divided region is a value between the first threshold value (High) and the second threshold value (Low) as illustrated in FIG. 6, and the cognitive load decreases. In this case, the information presentation control unit 32 presents driving assistance information indicating that the cognitive load is decreasing.

Time-series images (a) to (d) in FIG. 17 represent an example that the prediction error exceeding the threshold value occurs in few divided regions. This may occur in a case where there is little change in the landscape ahead, such as a case where the ego vehicle is driven following the preceding vehicle in a traffic jam. In such a case, the driver's attention is distracted, careless driving may occur, and inconvenience such as collision with the preceding vehicle may occur.

Therefore, the information presentation control unit 32 displays, as illustrated in FIG. 13B, a line to guide the gaze of the driver to the center of the information acquisition screen to call attention. Alternatively, the information presentation control unit 32 presents driving assistance information (message or voice) such as "pay attention ahead" in the center of the information acquisition screen to guide the gaze of the driver to the center of the screen to call attention. As a result, it is possible to urge the driver to pay attention ahead, prevent inconvenience such as collision, and ensure safety.

Period of Time to Present Driving Assistance Information

FIG. 18 is a diagram for describing a period of time to present driving assistance information. As illustrated in FIG. 6, when the sum of the prediction errors of each divided region exceeds the first threshold value (High) or the second threshold value (Low), the information presentation control unit 32 presents the driving assistance information for a given period of time (or while exceeding any of the threshold values). FIG. 18 illustrates that the sum of the prediction errors exceeds any of the threshold values at time $t_1$. In this case, the information presentation control unit 32 presents the driving assistance information for a given period of time from time $t_1$.

FIG. 18 illustrates that the sum of the prediction errors exceeds any of the threshold values at time $t_2$ and time $t_3$. In this case, the information presentation control unit 32 presents the first driving assistance information for a given period of time from time $t_2$ and presents the second driving assistance information for a given period of time from time $t_3$. When the second driving assistance information is presented, the presentation of the first driving assistance information may be ended.

In this way, by presenting the driving assistance information for a predetermined period of time (or while any threshold value is exceeded), it is possible to prevent inconvenience that the presentation of the driving assistance information takes a long time and annoys the driver.

Control to Change Driving Assistance Information to be Presented

When a large amount of driving assistance information is presented on the information presentation unit 5, it is not preferable in terms of safe driving because it imparts inconvenience to the driver. Therefore, depending on circumstances, the information presentation control unit 32 changes the presence or absence, the number, the position, the type, and the like of the driving assistance information to be presented.

Figure 19A:
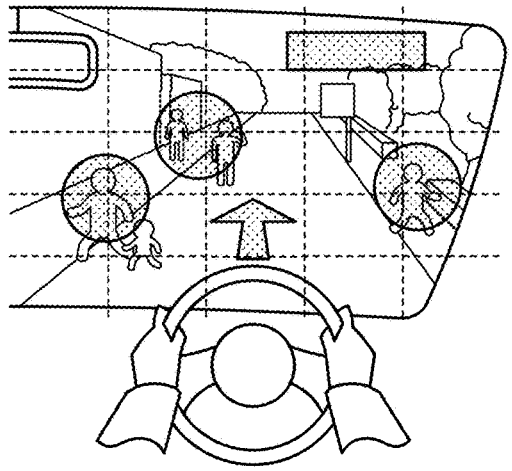
FIGS. 19A and 19B are diagrams illustrating examples of changing presence or absence of driving assistance information.
Figure 19B:
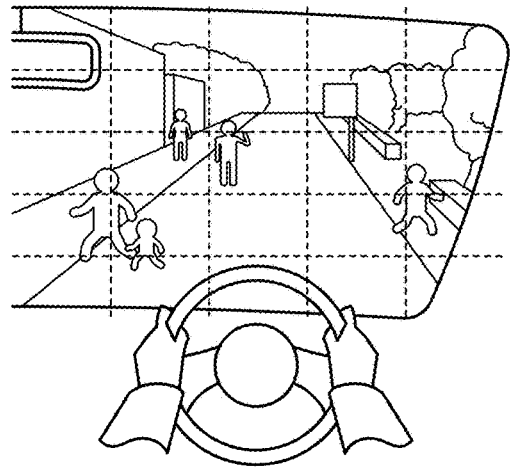

FIGS. 19A and 19B are examples of changing the presence or absence of driving assistance information. For example, as illustrated in FIG. 19A, normally, an arrow in a traveling direction, a circle indicating a pedestrian, and a rectangular region in an upper right in a landscape behind the ego vehicle are displayed on the image presentation screen of the information presentation unit 5. When the number of pieces of driving assistance information presented in this manner increases, the driver's attention is rather distracted.

Therefore, when, for example, the vehicle is stopped or the vehicle is traveling at a low speed such as less than 15 km/h, the information presentation control unit 32 hides the driving assistance information as illustrated in FIG. 19B. As a result, it is possible to prevent inconvenience that unnecessary driving assistance information is displayed to annoy the driver.

Figure 20A:
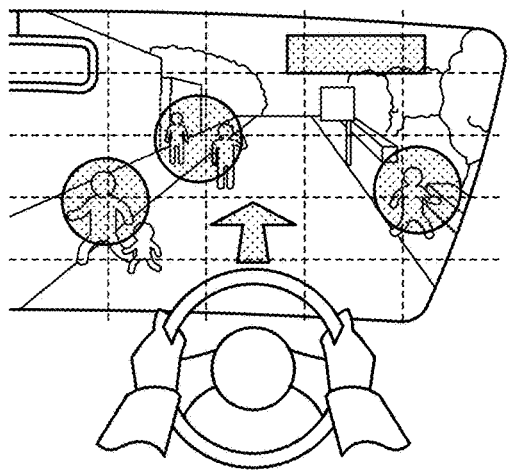
FIGS. 20A and 20B are diagrams illustrating examples of changing the number of pieces of driving assistance information.
Figure 20B:
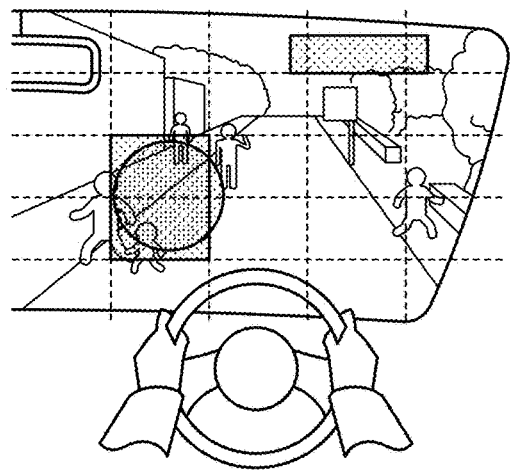

FIGS. 20A and 20B illustrate examples of changing the number of pieces of driving assistance information (the number of presentation). In a normal state, as illustrated in FIG. 20A, an arrow in a traveling direction, a circle indicating a pedestrian, and a rectangular region in an upper right in a landscape behind the ego vehicle are displayed on the image presentation screen of the information presentation unit 5. When the number of pieces of driving assistance information presented in this manner increases, the driver's attention is rather distracted.

Therefore, the information presentation control unit 32 preferentially presents only driving assistance information for a target having a high risk level, such as a region where a prediction error occurs as illustrated in FIG. 20B. As a result, only driving assistance information that is truly necessary can be presented to call the driver's attention.

Figure 21C:
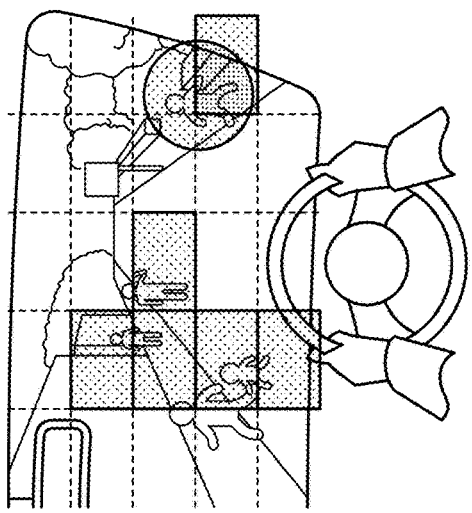
FIGS. 21A to 21C are diagrams illustrating examples of changing a position of driving assistance information.
Figure 21B:
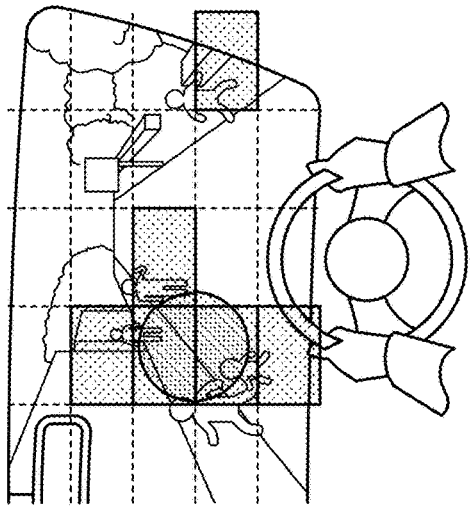
Figure 21A:
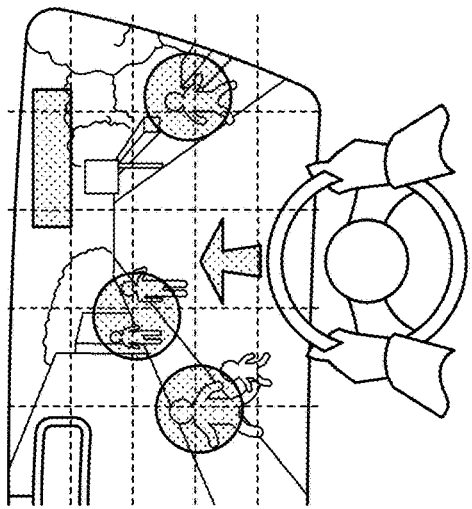

FIGS. 21A to 21C illustrate examples of changing the position of the driving assistance information. For example, as illustrated in FIG. 20A, normally, an arrow in a traveling direction, a circle indicating a pedestrian, and a rectangular region in an upper right in a landscape behind the ego vehicle are displayed on the image presentation screen of the information presentation unit 5. When the number of pieces of driving assistance information presented in this manner increases, the driver's attention is rather distracted.

Therefore, as illustrated in FIG. 21B or FIG. 21C, the information presentation control unit 32 changes the position of the driving assistance information to be presented based on the divided region having the prediction error exceeding the threshold value.

As a result, the driving assistance information can be presented at a necessary position according to the known situation of the vehicle to call the driver's attention.

Figure 22A:
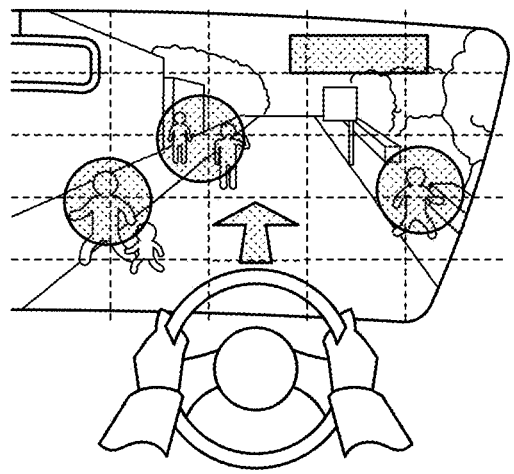
FIGS. 22A and 22B are diagrams illustrating examples of changing the type of driving assistance information.
Figure 22B:
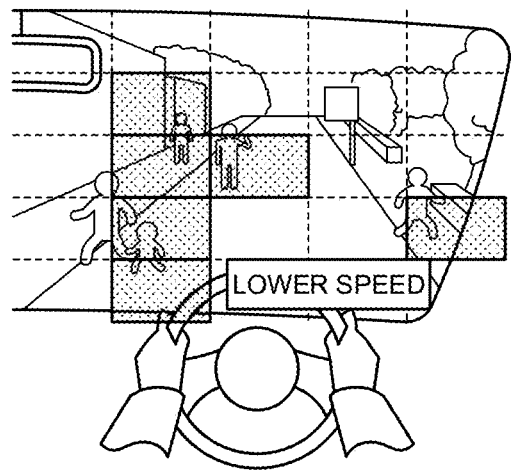

FIGS. 22A and 22B illustrate examples of changing the type of driving assistance information. As illustrated in FIG. 22A, when there are many pedestrians and stopped vehicles in front of the vehicle, many divided regions having prediction errors exceeding the threshold value are also generated as illustrated in FIG. 22B. In this case, the information presentation control unit 32 makes presentation by changing the driving assistance information indicated by the arrow to a message for calling attention, such as "lower speed". As a result, the driving assistance information can be more accurately presented to the driver.

Effects of First Embodiment

As is clear from the above description, in the driving assistance device 1 according to the first embodiment, the potential hazards judgement unit 31 detects a latent recognition region unconsciously recognized by a human in the entire imaging region of the captured image based on the captured image of the vehicle in the traveling direction captured by the vehicle exterior camera unit 23 of the vehicle. Then, the information presentation control unit 32 presents predetermined driving assistance information in a region on the information presentation unit estimated according to the detected latent recognition region.

As a result, it is possible to call attention to a region that is likely to be overlooked by the driver, the region being other than a region that the driver is unconsciously paying attention to, and it is possible to present appropriate driving assistance information according to the situation around the vehicle.

Moreover, the potential hazards judgement unit 31 detects, as a latent recognition region, a divided region having a feature values (prediction error or the like) exceeding a predetermined threshold value out of divided regions obtained by dividing the entire imaging region into a plurality of regions. As a result, it is possible to properly detect a region where the driver unconsciously pays attention, and to perform more appropriate presentation of the driving assistance information.

In addition, the information presentation control unit 32 presents the driving assistance information separately between a period of time during which the feature values (prediction error or the like) are less than a predetermined threshold value and a period of time during which the feature values exceed the threshold value. Specifically, the information presentation control unit 32 does not present the driving assistance information while the feature values (prediction error or the like) are less than a predetermined threshold value, and presents the driving assistance information while the feature values exceed the threshold value. As a result, it is possible to clearly identify the divided region that the driver unconsciously pays attention to and then present the driving assistance information that calls attention to the relative region, and thus, it is possible to secure safety.

In addition, the information presentation control unit 32 presents the driving assistance information for a predetermined period of time (or while the feature values exceed any of the threshold values). As a result, the driver can properly recognize the driving assistance information (the driver does not miss the driving assistance information because the presentation time is short).

In addition, the information presentation control unit 32 changes any one or more of the presence or absence, the presentation position, the number of presentation, or the type of presentation of the driving assistance information according to the detected latent recognition region. As a result, it is possible to selectively present necessary driving assistance information according to a known situation of the vehicle to call the driver's attention. Therefore, it is possible to display a large amount of driving assistance information and prevent inconvenience that causes inconvenience to the driver.

Second Embodiment

Next, a driving assistance device according to the second embodiment will be described. The driving assistance device of the second embodiment is an example of changing driving assistance information to be presented based on a traveling speed of a vehicle. Note that the first embodiment described above is different from the second embodiment described below only in this point. Therefore, hereinafter, only the difference between the two will be described, and redundant description will be omitted.

Figure 23:
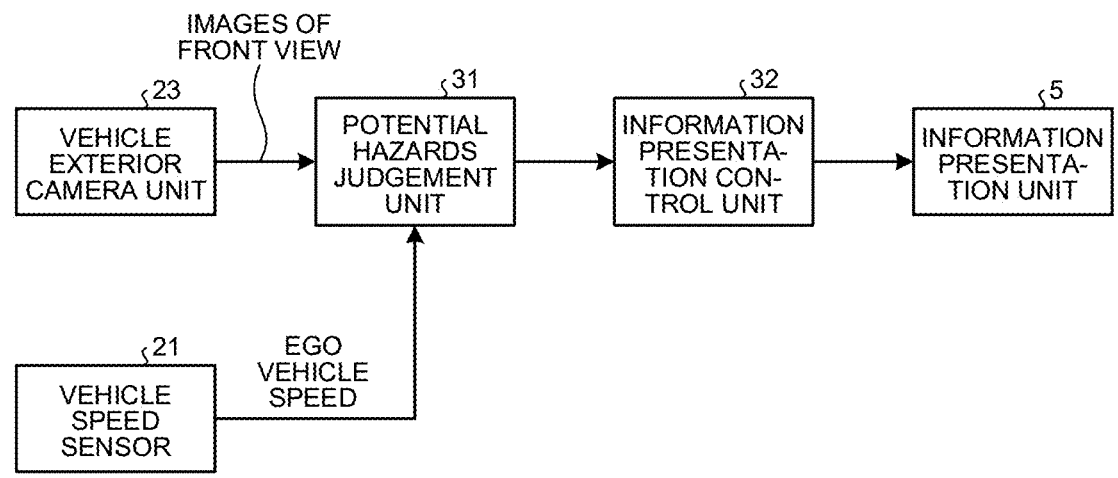
FIG. 23 is a functional block diagram illustrating a functional configuration of a driving assistance device according to the second embodiment.

FIG. 23 is a functional block diagram illustrating a functional configuration of a driving assistance device according to the second embodiment. As illustrated in FIG. 23, in the case of the driving assistance device according to the second embodiment, a potential hazards judgement unit 31 acquires the traveling speed (ego vehicle speed) of the vehicle detected by the vehicle speed sensor 21 illustrated in FIG. 2 together with the images of a front view captured by the vehicle exterior camera unit 23.

Figure 24:
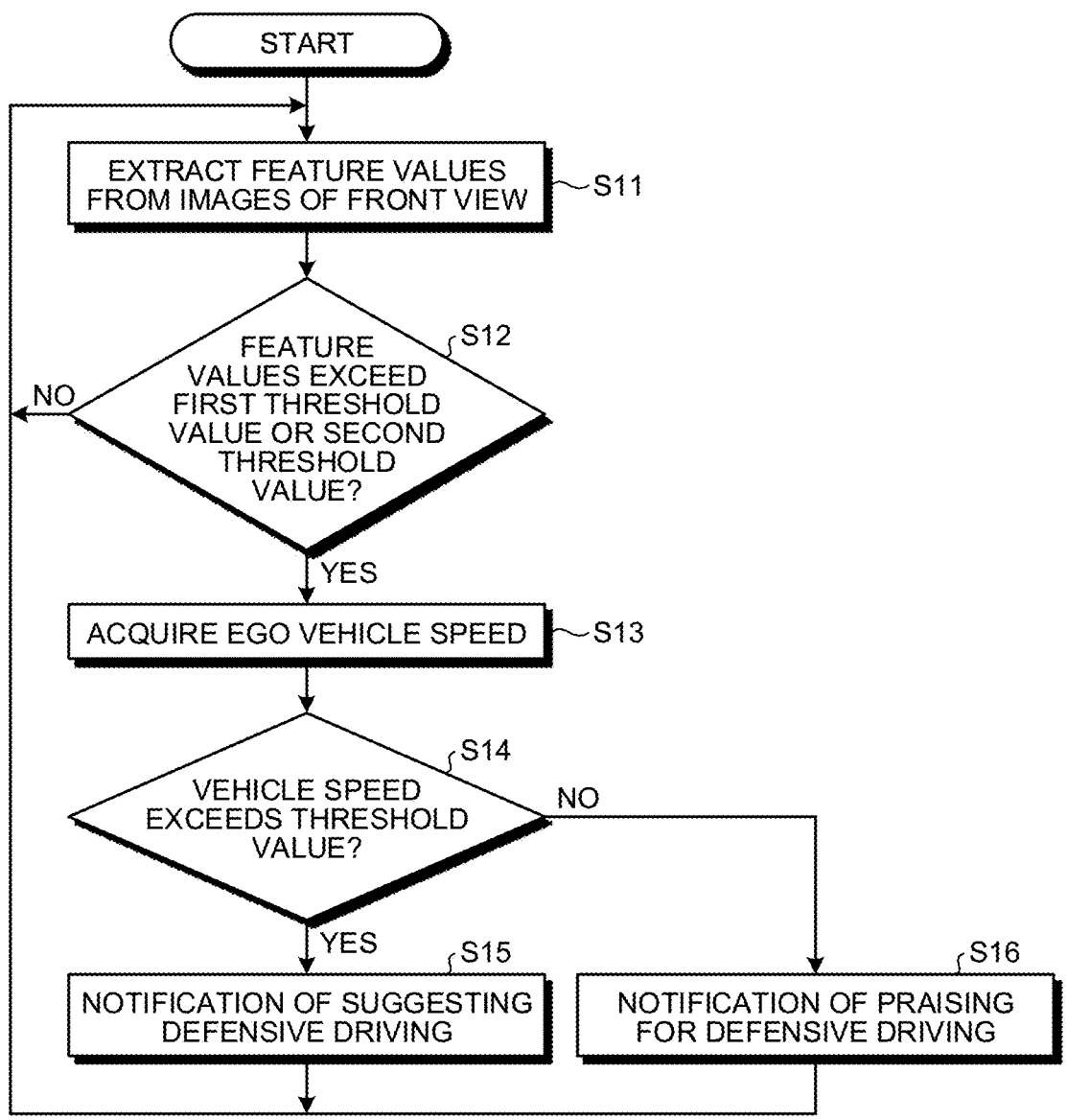
FIG. 24 is a flowchart illustrating a procedure of presentation operation of driving assistance information in the driving assistance device according to the second embodiment.

FIG. 24 is a flowchart illustrating a procedure of a presentation operation of driving assistance information in the driving assistance device according to the second embodiment. In this flowchart, the potential hazards judgement unit 31 extracts a feature values such as a prediction error for each divided region based on the captured image in front of the vehicle as described above (step S11). The information presentation control unit 32 compares the extracted feature values of each divided region with the first threshold value (High) and the second threshold value (Low) illustrated in FIG. 6, and determines whether the extracted feature values of each divided region exceed any of the threshold values (step S12).

When the extracted feature values of each divided region is determined to exceed any of the threshold values (step S12: Yes), the potential hazards judgement unit 31 acquires the traveling speed (ego vehicle speed) of the vehicle detected by the vehicle speed sensor 21 (step S13). In step S14, the potential hazards judgement unit 31 determines whether the acquired traveling speed of the vehicle exceeds a threshold value for traveling speed such as 30 km/h.

When the feature values of each divided region exceed any of the threshold values (step S12: Yes) and the traveling speed of the vehicle exceeds the traveling speed threshold value (step S14: Yes), it is necessary to pay attention to running out of a pedestrian, another vehicle, etc. Therefore, in step S15, the information presentation control unit 32 presents driving assistance information suggesting "defensive driving".

Figure 25A:
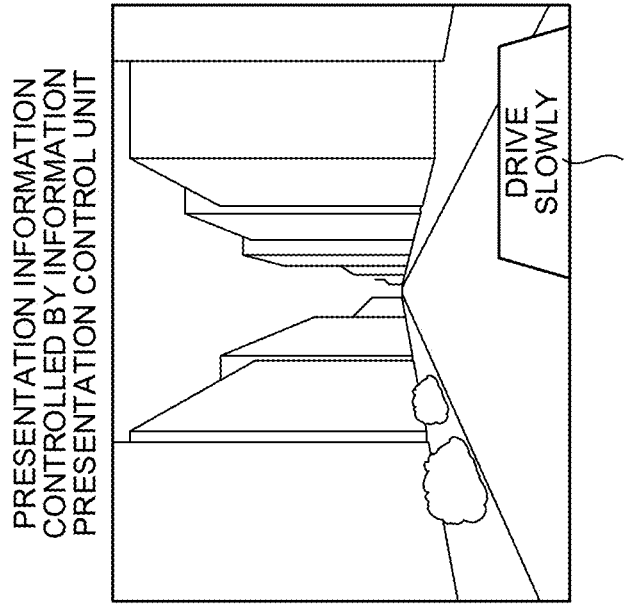
FIGS. 25A and 25B are diagrams illustrating presentation examples of driving assistance information suggesting "defensive driving"
Figure 25B:
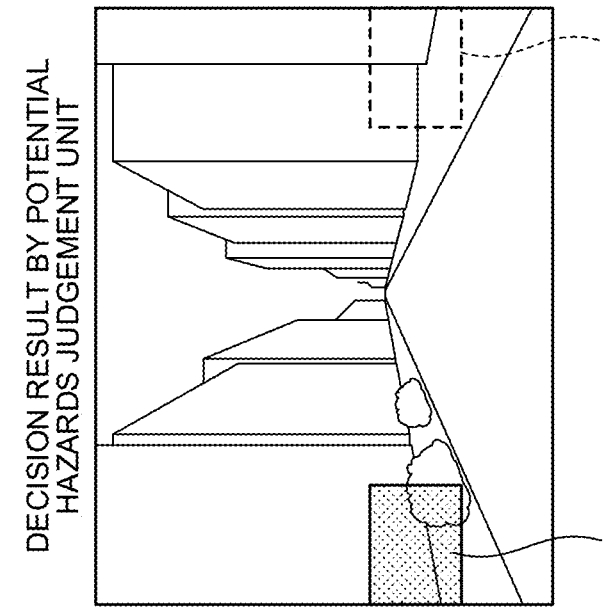

FIGS. 25A and 25B are diagrams illustrating presentation examples of driving assistance information suggesting "defensive driving". As illustrated in FIG. 25A, in a case where the prediction error of the divided region on the left side of the information acquisition screen indicates a value exceeding the threshold value, the region on the right side of the information acquisition screen indicates that it is easy for the driver to overlook the divided region, and measures against running out of a pedestrian or another vehicle are delayed. Therefore, as illustrated in FIG. 25B, the information presentation control unit 32 presents driving assistance information suggesting "defensive driving" such as "drive slowly" on the image presentation screen of the information presentation unit 5. As a result, the driver lowers the traveling speed of the vehicle and continues traveling while paying attention to running out of a pedestrian or another vehicle.

On the other hand, in the flowchart of FIG. 24, when the feature values of each divided region exceed any of the threshold values (step S12: Yes) but the traveling speed of the vehicle does not exceed the threshold value for the traveling speed (step S14: No), this means that the vehicle is traveling at a low speed, and the vehicle is operated to travel while paying attention to running out of a pedestrian or another vehicle.

In this case, in step S16, the information presentation control unit 32 presents driving assistance information praising for "defensive driving". FIGS. 26A and 26B are diagrams illustrating presentation examples of driving assistance information praising for this "defensive driving". As illustrated in FIG. 26A, in a case where the prediction error of the divided region on the left side of the information acquisition screen indicates a value exceeding the threshold value, the region on the right side of the information acquisition screen indicates that it is easy for the driver to overlook the divided region, and measures against running out of a pedestrian or another vehicle are delayed.

However, even in such a case, it is possible to prevent an accident in advance if the vehicle is moved slowly. Therefore, as illustrated in FIG. 26B, the information presentation control unit 32 presents driving assistance information praising for "defensive driving" such as "you are driving appropriately slowly" on the image presentation screen of the information presentation unit 5. As a result, the driver can recognize that the current traveling operation of the vehicle is the correct traveling operation, and continuously performs the traveling operation of the vehicle while paying attention to running out of a pedestrian or another vehicle. As a result, safety for the driver and the surrounding pedestrians can be secured.

Effects of Second Embodiment

As is clear from the above description, the driving assistance device according to the second embodiment detects the traveling speed of the vehicle together with the feature values and presents the driving assistance information. As a result, it is possible to change the driving assistance information to be presented according to the vehicle speed, present appropriate driving assistance information according to the vehicle speed, and obtain the effects same as those of the first embodiment described above.

Third Embodiment

Next, a driving assistance device according to third embodiment will be described. The driving assistance device of the third embodiment is an example of performing, for example, braking control according to the traveling speed of the vehicle and presenting the control content as driving assistance information. Note that the second embodiment described above is different from the third embodiment described below only in this point. Therefore, hereinafter, only the difference between the two will be described, and redundant description will be omitted.

Figure 27:
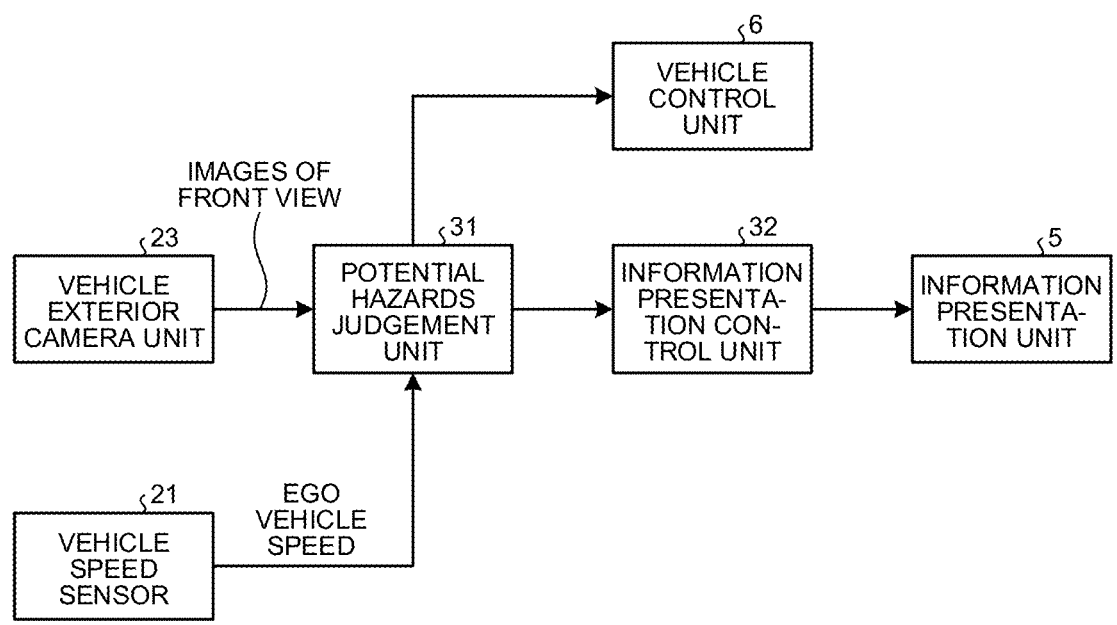
FIG. 27 is a functional block diagram illustrating a functional configuration of a driving assistance device according to the third embodiment.

FIG. 27 is a functional block diagram illustrating a functional configuration of a driving assistance device according to a third embodiment. As illustrated in FIG. 27, in the case of the driving assistance device according to the third embodiment, the potential hazards judgement unit 31 acquires the traveling speed (ego vehicle speed) of the vehicle detected by the vehicle speed sensor 21 illustrated in FIG. 2 together with the images of a front view captured by the vehicle exterior camera unit 23. When the traveling speed (ego vehicle speed) of the vehicle acquired from the vehicle speed sensor 21 is a traveling speed exceeding a predetermined threshold value (an example of a movement speed threshold value), the potential hazards judgement unit 31 notifies the vehicle control unit 6 of the detection result, so that the vehicle control unit 6 performs the braking control of the vehicle and the like, and the information presentation control unit 32 presents driving assistance information indicating that the braking control has been performed.

Figure 28:
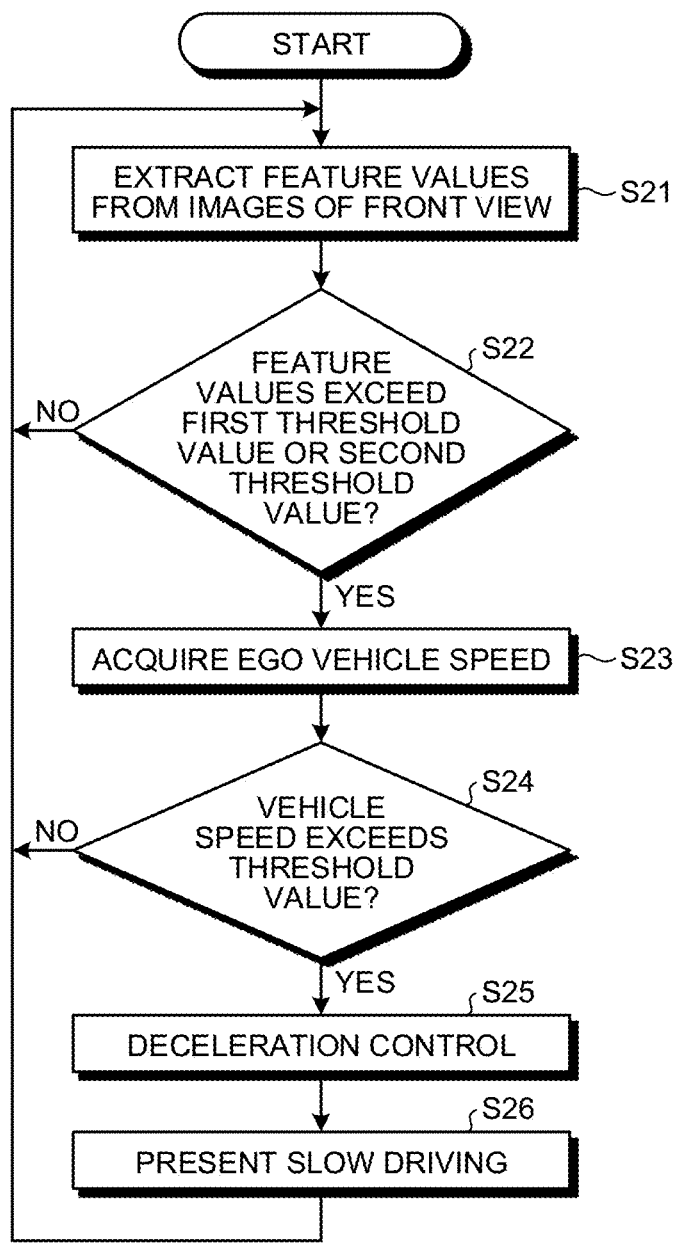
FIG. 28 is a flowchart illustrating a procedure of presentation operation of driving assistance information in the driving assistance device according to the third embodiment.

FIG. 28 is a flowchart illustrating a procedure of a presentation operation of driving assistance information in the driving assistance device according to the third embodiment. In this flowchart, the potential hazards judgement unit 31 extracts a feature values such as a prediction error for each divided region based on the captured image in front of the vehicle as described above (step S21). The information presentation control unit 32 compares the extracted feature values of each divided region with the first threshold value (High) and the second threshold value (Low) illustrated in FIG. 6, and determines whether the extracted feature values of each divided region exceed any of the threshold values (step S22).

When the extracted feature values of each divided region is determined to exceed any of the threshold values (step S22: Yes), the potential hazards judgement unit 31 acquires the traveling speed (ego vehicle speed) of the vehicle detected by the vehicle speed sensor 21 (step S23). In step S24, the potential hazards judgement unit 31 determines whether the acquired traveling speed of the vehicle exceeds a threshold value for traveling speed, for example, 30 km/h, and notifies the vehicle control unit 6 of the determination result.

When the determination result indicating that the traveling speed of the vehicle exceeds the threshold value for traveling speed is obtained from the potential hazards judgement unit 31, the vehicle control unit 6 performs operation of automatically operating the brake of the vehicle or automatically returning the accelerator pedal to perform deceleration control of the vehicle in step S25.

Figure 29:
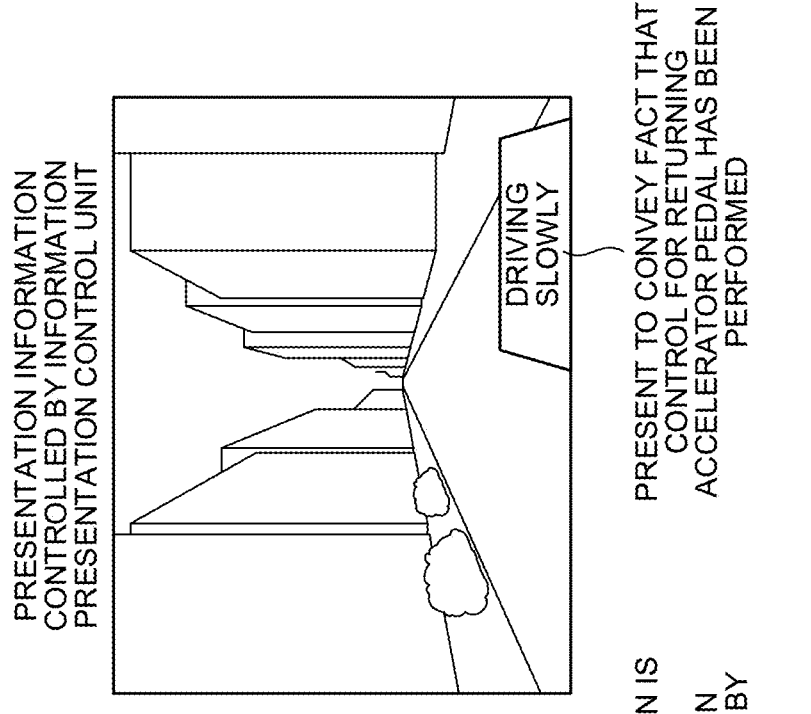
FIGS. 29A and 29B are diagrams illustrating presentation examples of driving assistance information indicating that deceleration control has been performed.

When such deceleration control is performed, the information presentation control unit 32 presents driving assistance information indicating that the deceleration control is performed on the image presentation screen of the information presentation unit 5 in step S26. FIGS. 29A and 29B are diagrams illustrating presentation examples of driving assistance information indicating that such deceleration control is performed. FIG. 29A illustrates a situation where the value of the prediction error is large in the right region of the information acquisition screen, the driver is unconsciously attentive to the right region, and the driver is inattentive to the left region, which is opposite.

In such a situation, when the traveling speed of the vehicle exceeds the threshold value for the traveling speed, it is difficult to cope with the running out of the pedestrian or another vehicle from the left region, and thus the vehicle control unit 6 performs the deceleration control of the vehicle by performing the automatic operation of the brake of the vehicle or the operation of automatically returning the accelerator pedal.

In addition, when such vehicle deceleration control is performed, the driver may misunderstand that the vehicle is broken due to unintended vehicle deceleration control. Therefore, as illustrated in FIG. 29B, the information presentation control unit 32 presents driving assistance information indicating that the braking control has been performed, such as "driving slowly", on the image presentation screen of the information presentation unit 5. As a result, the driver can recognize that the deceleration control is automatically performed because of the high traveling speed, and it is possible to prevent an inconvenience that the driver misunderstands as a failure or the like of the vehicle.

Although the case of performing the braking control of the vehicle is described as an example, other than this, other operation control of the vehicle such as adjustment control of the traveling lane by automatic operation of the steering wheel, and a blinker operation may be performed.

Effects of Third Embodiment

As is clear from the above description, the driving assistance device of the third embodiment detects vehicle information (traveling speed or the like) together with the feature values, and automatically performs braking control of the vehicle, for example, when the traveling speed exceeds a threshold value. In addition, the information presentation control unit 32 presents driving assistance information indicating that the braking control has been performed on the image presentation screen of the information presentation unit 5. As a result, it is possible to forcibly perform braking control of the vehicle to prepare for running out of a pedestrian or another vehicle from a region easily overlooked by the driver, and it is possible to obtain the effects same as those of the first embodiment and the second embodiment described above in addition to ensuring safety.

Fourth Embodiment

Next, a driving assistance device according to the fourth embodiment will be described. The driving assistance device of the fourth embodiment is an example of changing the driving assistance information to be presented in consideration of the dwell time of the gaze of the driver. Note that the first embodiment described above is different from the fourth embodiment described below only in this point. Therefore, hereinafter, only the difference between the two will be described, and redundant description will be omitted.

Figure 30:
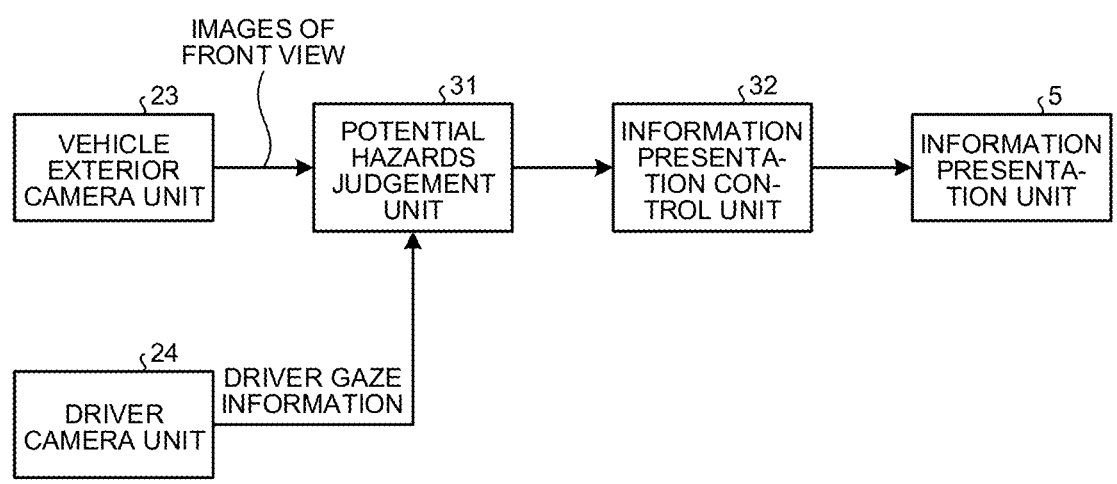
FIG. 30 is a functional block diagram illustrating a functional configuration of a driving assistance device according to the fourth embodiment.

FIG. 30 is a functional block diagram illustrating a functional configuration of a driving assistance device according to the fourth embodiment. As illustrated in FIG. 30, in the case of the driving assistance device of the fourth embodiment, the potential hazards judgement unit 31 acquires the face image of the driver captured by the driver camera unit 24 illustrated in FIG. 2 together with the images of a front view captured by the vehicle exterior camera unit 23.

Figure 31:
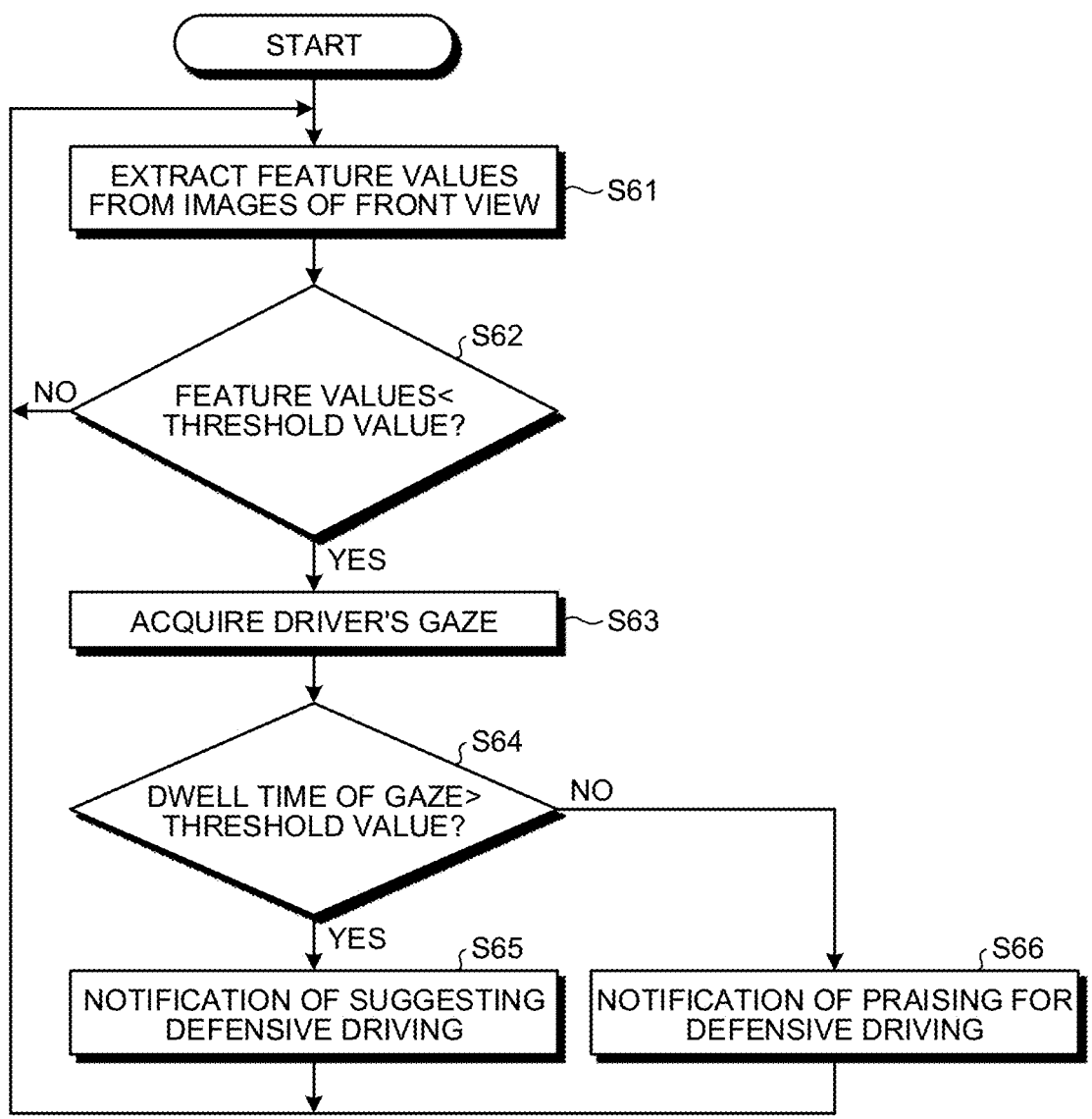
FIG. 31 is a flowchart illustrating a procedure of presentation operation of driving assistance information in the driving assistance device according to the fourth embodiment.

FIG. 31 is a flowchart illustrating a procedure of a presentation operation of driving assistance information in the driving assistance device according to the fourth embodiment. In this flowchart, the potential hazards judgement unit 31 extracts a feature values such as a prediction error for each divided region based on the captured image in front of the vehicle as described above (step S61). The information presentation control unit 32 compares the extracted feature values of each divided region with the first threshold value (High) and the second threshold value (Low) illustrated in FIG. 6, and determines whether the extracted feature values of each divided region exceed any of the threshold values (step S62).

When the extracted feature values of each divided region is determined to exceed any of the threshold values (step S62: Yes), the potential hazards judgement unit 31 functions as a gaze detection unit and acquires a face image of the driver captured by the driver camera unit 24 (step S63). Based on the acquired face image of the driver, the potential hazards judgement unit 31 detects a position in the information acquisition screen where the gaze of the driver retains and also detects a dwell time. Then, the potential hazards judgement unit 31 determines whether the dwell time of the gaze of the driver with respect to the divided region having the prediction error exceeding the threshold value exceeds the dwell time threshold value (step S64).

When the divided region has a large feature values such as the prediction error (step S62: Yes) and the dwell time of the gaze for this divided region exceeds the dwell time threshold value (step S64: Yes), it means that the gaze of the driver for the divided region is fixed and attention is biased. In this case, the information presentation control unit 32 presents a message suggesting slowdown such as "drive slowly" illustrated in FIG. 25B as the driving assistance information on the image presentation screen of the information presentation unit 5 so as to cope with the running out of a pedestrian or another vehicle, and suggests "defensive driving" to the driver (step S65). As a result, the biased attention of the driver can be returned to the state of paying attention to the entire region of the information acquisition screen, and it is possible to cope with the running out of a pedestrian or another vehicle and secure safety.

On the other hand, when the divided region has a large feature values such as a prediction error (step S62: Yes) but the dwell time of the gaze to the divided region does not exceed the dwell time threshold value (step S64: No), it means that the driver pays attention to other regions as well. Therefore, as illustrated in FIG. 26B, the information presentation control unit 32 presents a message praising for "defensive driving", such as "you are driving appropriately slowly", on the image presentation screen of the information presentation unit 5 as driving assistance information (step S66). As a result, the motivation of the driver for safe driving can be improved, and safety can be secured.

Either the first threshold value (High) or the second threshold value (Low) described in the present embodiment may be used. Alternatively, three or more levels of threshold values may be set and used.

Effects of Fourth Embodiment

As is clear from the above description, the driving assistance device according to the fourth embodiment detects the dwell time of the gaze of the driver together with the feature values and presents the driving assistance information. As a result, it is possible to change the driving assistance information to be presented according to the dwell time of the gaze of the driver, to present appropriate driving assistance information, and to obtain the effects same as those of the above-described embodiments.

Fifth Embodiment

Next, a driving assistance device according to the fifth embodiment will be described. In the driving assistance device according to each of the above-described embodiments, the prediction error is used as the feature values of each divided region. On the other hand, the driving assistance device of the fifth embodiment is an example of using the saliency map as the feature values of each divided region. Note that each of the above-described embodiments is different from the fifth embodiment described below only in this point. Therefore, hereinafter, only differences will be described, and redundant description will be omitted.

Figure 32:
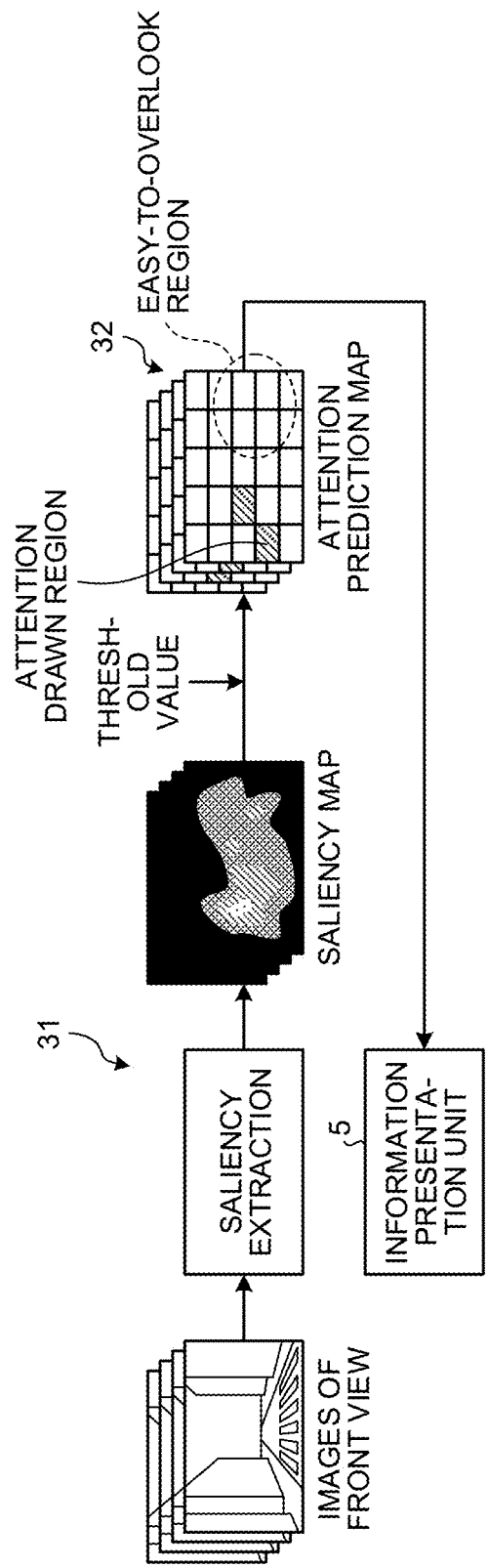
FIG. 32 is a schematic diagram illustrating a procedure until when the driving assistance device according to the fifth embodiment presents driving assistance information based on a saliency map.

FIG. 32 is a schematic diagram illustrating a procedure until when the driving assistance device according to the fifth embodiment presents the driving assistance information based on the saliency map. In this case, the potential hazards judgement unit 31 extracts edges (or contours) of a human, an object, and the like appearing in a captured image captured by the vehicle exterior camera unit 23 based on, for example, luminance data. Then, the potential hazards judgement unit 31 generates a saliency map indicating the content of the edge in each region on the captured image. In addition, the potential hazards judgement unit 31 divides the entire region of the saliency map into twenty-five divided regions as described above, and generates an attention prediction map in which a divided region where the ratio of the edge exceeds a predetermined saliency threshold value is detected as a latent recognition region.

The divided region in which the content of the edge exceeds the saliency threshold value refers to a region in which the driver unconsciously pays attention. Therefore, as described above, the information presentation control unit 32 presents, on the image presentation screen of the information presentation unit 5, driving assistance information for calling the driver's attention with respect to the relative region with respect to the divided region in which the content of the edge exceeds the saliency threshold value.

As a result, it is possible to call attention to a region that is likely to be overlooked by the driver, the region being other than a region where the driver unconsciously pays attention, and it is possible to obtain effects similar to those of the above-described embodiments, such as presenting appropriate driving assistance information according to the situation around the vehicle.

Sixth Embodiment

Next, a driving assistance device according to the sixth embodiment will be described. In the driving assistance device of each of the above-described embodiments, the prediction error or the saliency map is used as the feature values of each divided regions. On the other hand, the driving assistance device of the sixth embodiment is an example that both the prediction error and the content (saliency) of the edge are used as the feature values of each divided region. Note that each of the above-described embodiments is different from the sixth embodiment described below only in this point. Therefore, hereinafter, only differences will be described, and redundant description will be omitted.

Figure 33:
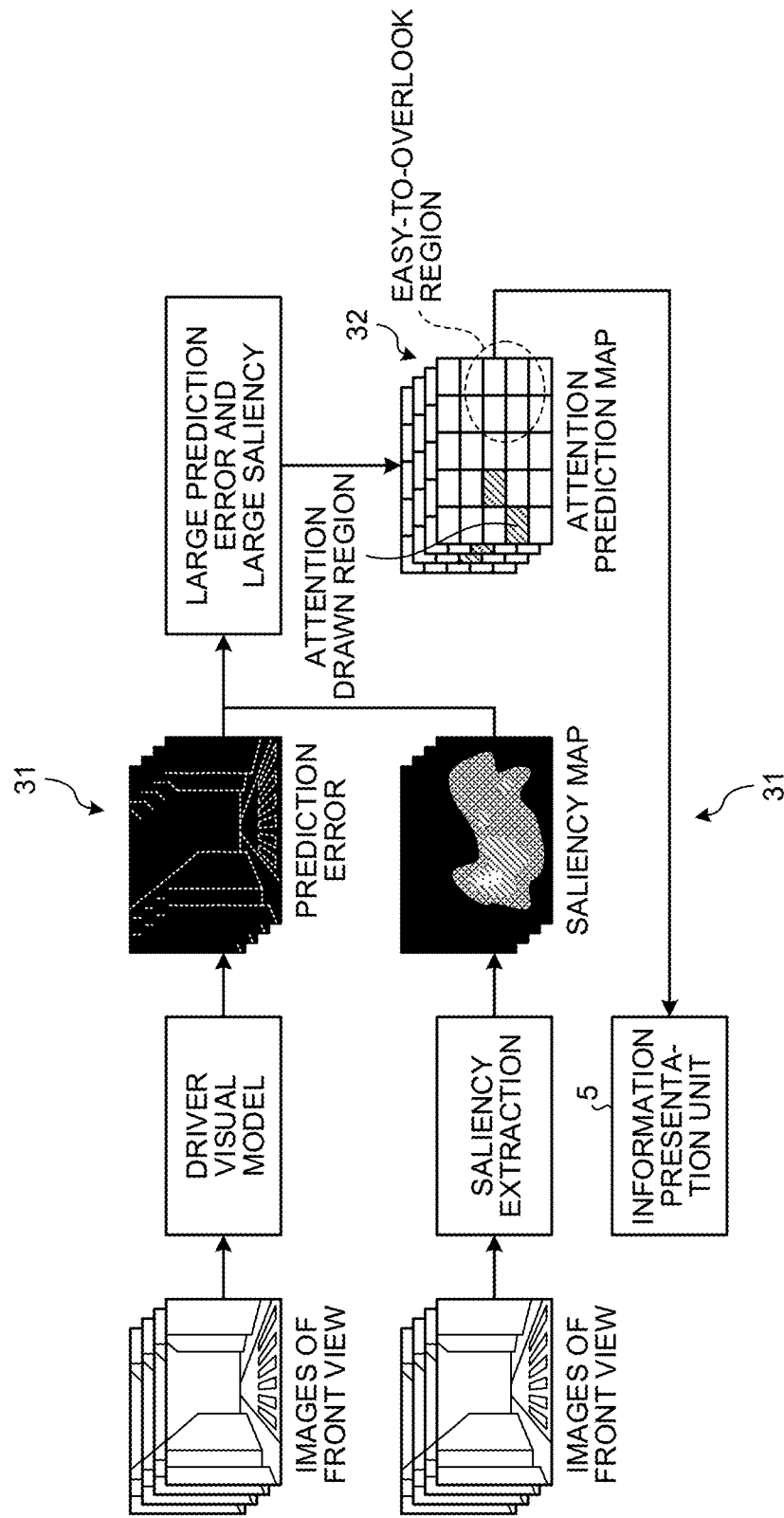
FIG. 33 is a schematic diagram illustrating a procedure until when the driving assistance device according to the sixth embodiment presents driving assistance information based on a prediction error and a saliency map.
Figure 34:
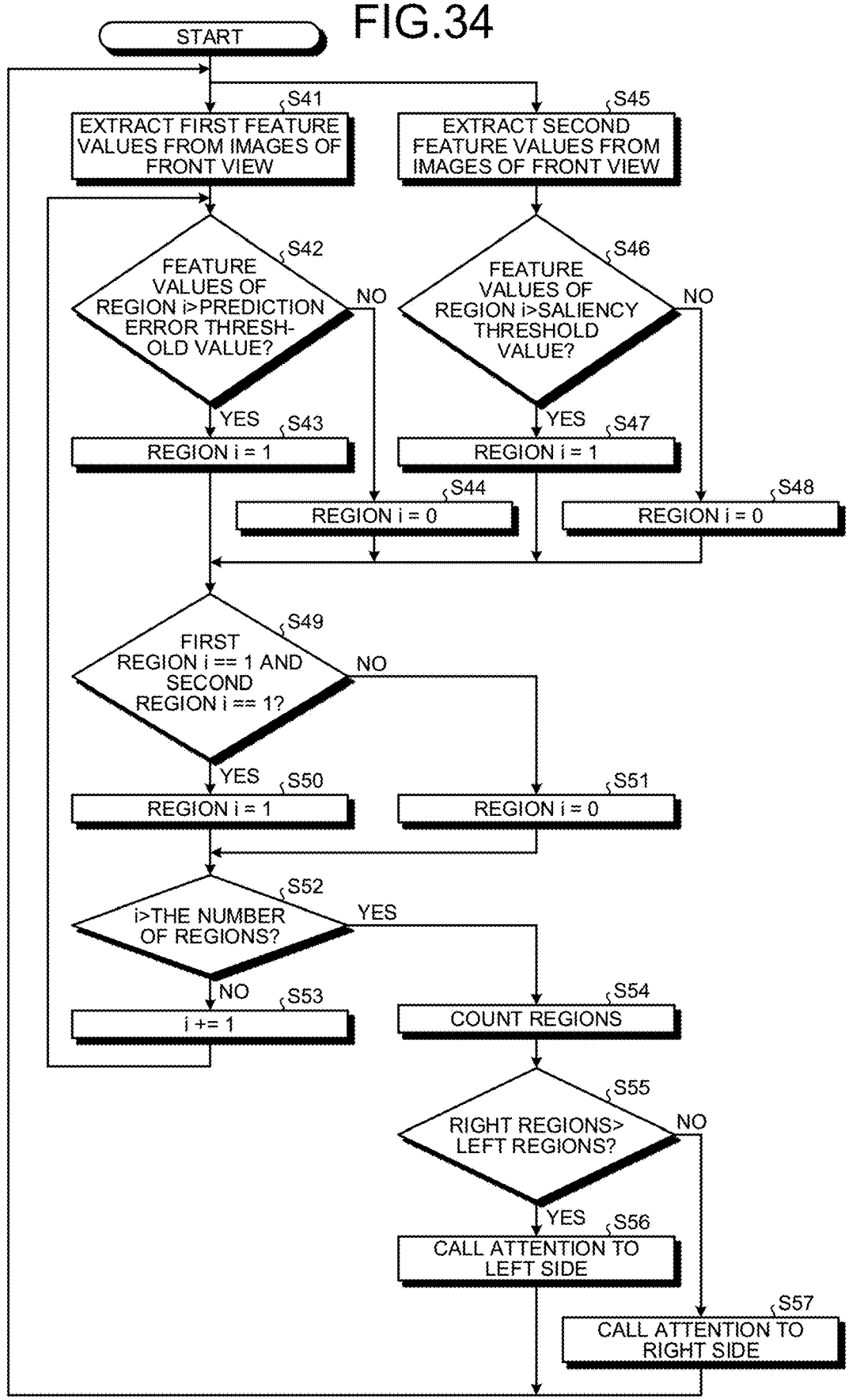
FIG. 34 is a flowchart illustrating a procedure of a presentation operation of driving assistance information based on a prediction error and a saliency map in the driving assistance device according to the sixth embodiment.

FIG. 33 is a schematic diagram illustrating a procedure until when the driving assistance device according to the sixth embodiment presents the driving assistance information based on the prediction error and the saliency map. FIG. 34 is a flowchart illustrating a procedure of a presentation operation of driving assistance information based on the prediction error and the saliency map in the driving assistance device according to the sixth embodiment.

First, in steps S41 to S44 of the flowchart of FIG. 34, as described with reference to the flowchart of FIG. 10, the potential hazards judgement unit 31 detects the prediction error (first feature values) for each divided region based on the captured image captured by the vehicle exterior camera unit 23. Similarly, in steps S45 to S48, the potential hazards judgement unit 31 detects the content (saliency: second feature values) of the edge for each divided region based on the captured image captured by the vehicle exterior camera unit 23.

In steps S49 to S51, as illustrated in FIG. 33, the potential hazards judgement unit 31 detects a divided region where the prediction error is larger than a predetermined threshold value and the content (saliency) of the edge is larger than a predetermined threshold value as a latent recognition region, and generates an attention prediction map. By detecting the latent recognition region using both the prediction error and the saliency, the latent recognition region can be detected more accurately.

In step S52, the potential hazards judgement unit 31 determines whether such latent recognition region detection processing has been completed for all the twenty-five divided regions. In a case where the latent recognition region detection processing for all the twenty-five divided regions has not been completed, in step S53, the number of the divided region where the latent recognition region detection processing is performed is incremented by one, and the process returns to step S42.

On the other hand, in a case where the latent recognition region detection processing for all the twenty-five divided regions is completed, the process proceeds to step S54. In step S54, the information presentation control unit 32 counts the number of latent recognition regions located in the right region of the information acquisition screen and the number of latent recognition regions located in the left region of the information acquisition screen. In addition, in step S55, the information presentation control unit 32 determines whether the number of latent recognition regions located in the right region of the information acquisition screen is larger than the number of latent recognition regions located in the left region of the information acquisition screen.

In response to determining that the number of latent recognition regions located in the right region of the information acquisition screen is larger than the number of latent recognition regions located in the left region of the information acquisition screen (step S55: Yes), the information presentation control unit 32 presents driving assistance information for calling attention to the left region of the information acquisition screen in step S56.

On the other hand, in response to determining that the number of latent recognition regions located in the right region of the information acquisition screen is smaller than the number of latent recognition regions located in the left region of the information acquisition screen (step S55: No), the information presentation control unit 32 presents driving assistance information for calling attention to the right region of the information acquisition screen in step S57.

As a result, it is possible to obtain the effects same as those of the above-described embodiments, such as calling the driver's attention to a relative region with respect to a region where the driver is unconsciously attentive and ensuring safety. In addition, in the case of the sixth embodiment, since the latent recognition region is detected using both the prediction error and the content (saliency) of the edge, the latent recognition region can be detected more accurately.

Seventh Embodiment

Next, a driving assistance device according to the seventh embodiment will be described. The driving assistance device according to the sixth embodiment described above is an example that the latent recognition region is detected using both the prediction error and the saliency as the feature values of each divided region. On the other hand, the driving assistance device of the seventh embodiment is an example of presenting the driving assistance information based on the prediction error and the dwell time of the driver's gaze. Note that each of the above-described embodiments is different from the seventh embodiment described below only in this point. Therefore, hereinafter, only differences will be described, and redundant description will be omitted.

Figure 35:
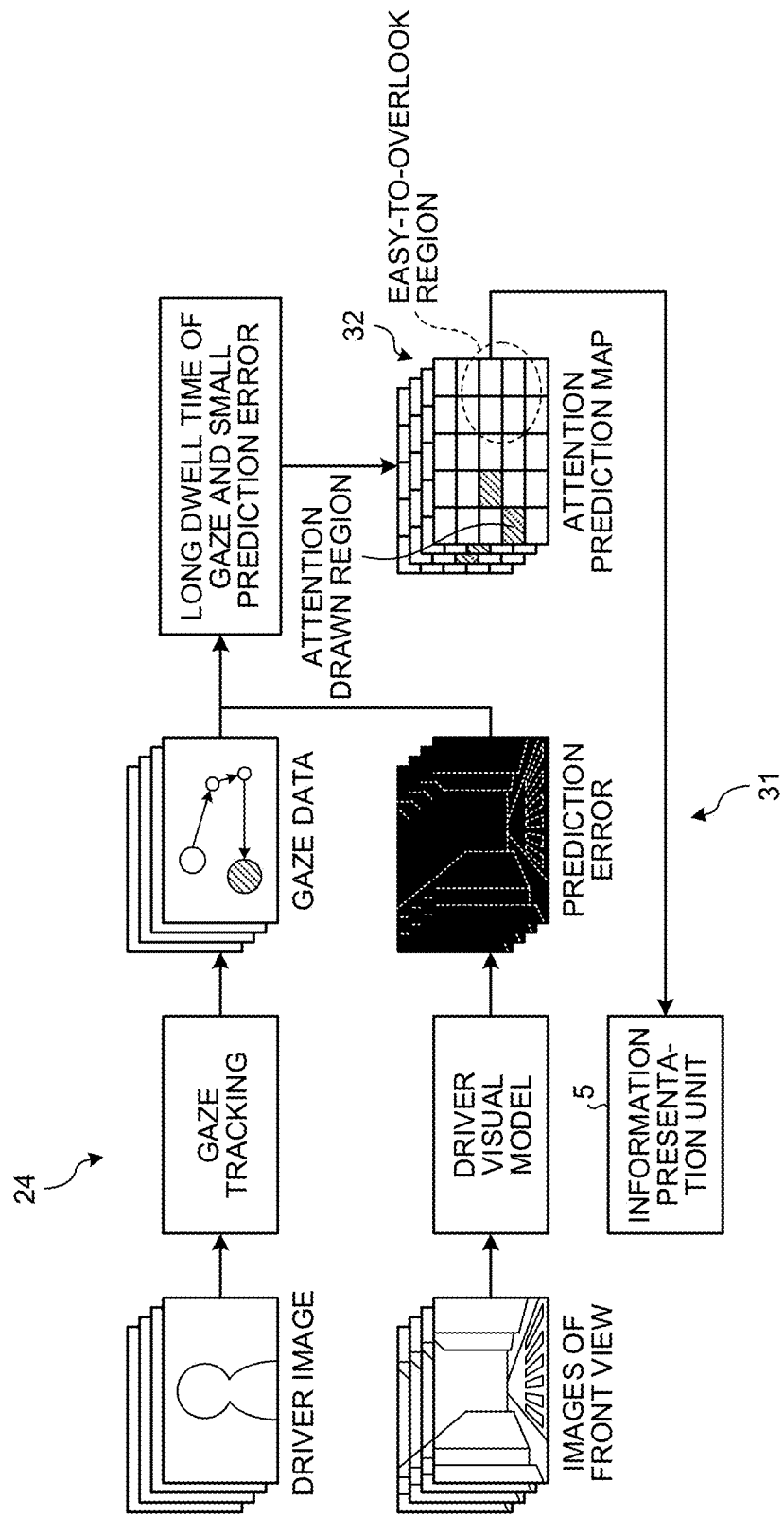
FIG. 35 is a schematic diagram illustrating a procedure until when the driving assistance device according to the seventh embodiment presents driving assistance information based on a prediction error and a dwell time of a gaze.

FIG. 35 is a schematic diagram illustrating a procedure until when the driving assistance device according to the seventh embodiment presents the driving assistance information based on the prediction error and the dwell time of the gaze. In this case, the potential hazards judgement unit 31 detects the prediction error for each divided region based on the captured image captured by the vehicle exterior camera unit 23. In addition, the potential hazards judgement unit 31 detects the dwell time of the gaze of the driver with respect to each divided region based on the captured image of the face of the driver captured by the driver camera unit 24.

Then, the potential hazards judgement unit 31 generates an attention prediction map indicating a divided region where the prediction error is less than a predetermined threshold value and the dwell time of the gaze exceeds a predetermined threshold value out of the divided regions. The fact that the prediction error is a divided region smaller than the predetermined threshold value and the dwell time of the gaze of the driver with respect to the divided region exceeds the predetermined threshold value means a state where the driver sees a region that is easily overlooked without paying attention.

Therefore, the information presentation control unit 32 presents, on the image presentation screen of the information presentation unit 5, driving assistance information for calling attention to a divided region where the prediction error is less than the predetermined threshold value and the dwell time of the gaze exceeds the predetermined threshold value. As a result, it is possible to obtain the effects same as those of the above-described embodiments, such as calling the driver's attention to a divided region where the prediction error is less than the predetermined threshold value and the dwell time of the gaze exceeds the predetermined threshold value, and ensuring safety.

Eighth Embodiment

Next, a driving assistance device according to the eighth embodiment will be described. The driving assistance device of the seventh embodiment described above is an example of presenting the driving assistance information using the prediction error and the dwell time of the driver's gaze. On the other hand, a driving assistance device according to the eighth embodiment described below is an example of presenting driving assistance information using the saliency and the dwell time of the driver's gaze. Note that each of the above-described embodiments is different from the eighth embodiment described below only in this point. Therefore, hereinafter, only differences will be described, and redundant description will be omitted.

FIG. 36 is a schematic diagram illustrating a procedure until when the driving assistance device according to the eighth embodiment presents driving assistance information based on the saliency and the dwell time of the gaze. In this case, the potential hazards judgement unit 31 detects the saliency, which is the content of the edge described above, for each divided region based on the captured image captured by the vehicle exterior camera unit 23. In addition, the potential hazards judgement unit 31 detects the dwell time of the gaze of the driver with respect to each divided region based on the captured image of the face of the driver captured by the driver camera unit 24.

Then, the potential hazards judgement unit 31 generates an attention prediction map indicating a divided region where the content of the edge is less than a predetermined threshold value (small saliency) and the dwell time of the gaze exceeds the predetermined threshold value out of the divided regions. The fact that the divided region has the "small" saliency and the dwell time of the gaze of the driver with respect to the divided region exceeds the predetermined threshold value means a state where the driver sees a region that is easily overlooked without paying attention.

Therefore, the information presentation control unit 32 presents, on the image presentation screen of the information presentation unit 5, driving assistance information for calling attention to a divided region where the saliency is "small" and the dwell time of the gaze exceeds a predetermined threshold value. As a result, it is possible to obtain the effects same as those of the above-described embodiments, such as calling the driver's attention to a divided region where the prediction error is less than the predetermined threshold value and the dwell time of the gaze exceeds the predetermined threshold value, and ensuring safety.

While some embodiments have been described, these embodiments have been presented by way of example only, and are not intended to limit the scope of the inventions. Indeed, the novel methods and systems described herein may be embodied in a variety of other forms; moreover, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A driving assistance device comprising:
   a hardware processor connected to a memory and configured to:
   detect a latent recognition region being unconsciously recognized by a human in an entire imaging region of a captured image captured by an external camera provided in a mobile body, the captured image being an image of at least a traveling direction in which the mobile body travels, the latent recognition region being detected based on a predetermined feature value included in the captured image;
   present predetermined driving assistance information in a region on a display device, the region being estimated in accordance with the detected latent recognition region;
   detect a gaze of a driver; and
   present the driving assistance information in a divided region where a dwell time of the detected gaze is equal to or longer than a predetermined dwell time and a prediction error is less than the threshold value.

2. The driving assistance device according to claim 1, wherein the hardware processor is configured to detect, as the latent recognition region, a divided region having a predetermined feature value exceeding a predetermined threshold value out of divided regions obtained by dividing the entire imaging region into a plurality of regions.

3. The driving assistance device according to claim 2, wherein the hardware processor is configured to present the driving assistance information separately between a period of time during which the feature value is less than the threshold value and a period of time during which the feature value exceeds the threshold value.

4. The driving assistance device according to claim 2, wherein the hardware processor is configured to:
   present the driving assistance information while the feature value exceeds the threshold value, or
   present the driving assistance information for a given period of time after the feature value exceeds the threshold value.

5. The driving assistance device according to claim 2, wherein the hardware processor is configured to:
   detect, for each of the divided regions, a prediction error being a difference between pixels of a predicted image predicted from a past image captured in a past by the external camera and pixels of an actual captured image actually captured by the external camera at a time of the predicted image; and
   detect, as the latent recognition region, a divided region having the prediction error exceeding a predetermined threshold value.

6. The driving assistance device according to claim 2, wherein the hardware processor is configured to:
   detect an edge of an object from a captured image captured by the external camera; and
   detect, as the latent recognition region, a divided region where a ratio of the edge exceeds a predetermined threshold value out of the divided regions.

7. The driving assistance device according to claim 2, wherein the hardware processor is configured to:
   detect, for each of the divided regions, a prediction error indicating a difference between pixels of a predicted current image corresponding to a current captured image generated by prediction from a captured image captured in a past by the external camera, and pixels of a current captured image captured by the external camera;
   detect a divided region including an edge of an object from the captured image captured by the external camera; and
   detect, as the latent recognition region, a divided region from which a prediction error exceeding a predetermined threshold value is detected and in which the edge exceeding a predetermined threshold value is included.

8. The driving assistance device according to claim 1, wherein the hardware processor is configured to change one or more items in accordance with the detected latent recognition region, the items including:
   presence or absence of the presentation of the driving assistance information,
   a position of the presentation of the driving assistance information,
   a number of the presentation of the driving assistance information, and
   a type of the driving assistance information.

9. The driving assistance device according to claim 8, further comprising a speed detection sensor configured to detect a movement speed of the mobile body,
   wherein the hardware processor is configured to change at least the type of the driving assistance information to be presented, the type being changed between a case where a movement speed of the mobile body detected by the speed detection sensor is equal to or more than a predetermined threshold value and a case where the movement speed is less than the predetermined threshold value.

10. The driving assistance device according to claim 1, further comprising a speed detection sensor configured to detect a movement speed of the mobile body,
   wherein the hardware processor is configured to control operation of the mobile body in accordance with a movement speed of the mobile body detected by the speed detection sensor.

11. A driving assistance method implemented by a computer, the method comprising:
   detecting a latent recognition region being unconsciously recognized by a human in an entire imaging region of a captured image captured by an external camera provided in a mobile body, the captured image being an image of at least a traveling direction in which the mobile body travels, the latent recognition region being detected based on a predetermined feature value included in the captured image;
   presenting predetermined driving assistance information in a region on a display device, the region being estimated in accordance with the detected latent recognition region;
   detecting a gaze of a driver; and
   presenting the driving assistance information in a divided region where a dwell time of the detected gaze is equal to or longer than a predetermined dwell time and a prediction error is less than the threshold value.

12. A non-transitory computer-readable recording medium on which programmed instructions are recorded, the instructions causing a computer to execute processing, the processing comprising:
   detecting a latent recognition region being unconsciously recognized by a human in an entire imaging region of a captured image captured by an external camera provided in a mobile body, the captured image being an image of at least a traveling direction in which the mobile body travels, the latent recognition region being detected based on a predetermined feature value included in the captured image;
   presenting predetermined driving assistance information in a region on a display device, the region being estimated in accordance with the detected latent recognition region;
   detecting a gaze of a driver; and
   presenting the driving assistance information in a divided region where a dwell time of the detected gaze is equal to or longer than a predetermined dwell time and a prediction error is less than the threshold value.

* * * * *